United States Patent
Triantafillou et al.

(10) Patent No.: US 9,135,446 B2
(45) Date of Patent: Sep. 15, 2015

(54) SYSTEMS AND METHODS TO PROVIDE SECURE STORAGE

(71) Applicants: Nicholas D. Triantafillou, Portland, OR (US); Paritosh Saxena, Portland, OR (US); Paul J. Thadikaran, Ranch Cordova, CA (US); David Michael Durham, Beaverton, OR (US)

(72) Inventors: Nicholas D. Triantafillou, Portland, OR (US); Paritosh Saxena, Portland, OR (US); Paul J. Thadikaran, Ranch Cordova, CA (US); David Michael Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 30 days.

(21) Appl. No.: 13/630,043

(22) Filed: Sep. 28, 2012

(65) Prior Publication Data

US 2014/0096260 A1    Apr. 3, 2014

(51) Int. Cl.
  *G06F 21/00*    (2013.01)
  *G06F 21/57*    (2013.01)
  *G06F 21/10*    (2013.01)
  *H04L 29/06*    (2006.01)

(52) U.S. Cl.
  CPC .............. *G06F 21/57* (2013.01); *G06F 21/10* (2013.01); *H04L 63/0428* (2013.01)

(58) Field of Classification Search
  None
  See application file for complete search history.

(56) References Cited

U.S. PATENT DOCUMENTS

| 6,289,455 | B1 * | 9/2001 | Kocher et al. .................. 713/194 |
| 7,657,941 | B1 * | 2/2010 | Zaitsev ......................... 726/24 |
| 2003/0055994 | A1 * | 3/2003 | Herrmann et al. ............. 709/229 |
| 2004/0255145 | A1 * | 12/2004 | Chow ............................ 713/200 |
| 2009/0222910 | A1 * | 9/2009 | Le Bihan et al. ............... 726/19 |
| 2012/0117348 | A1 * | 5/2012 | Triantafillou et al. ........ 711/163 |
| 2012/0159041 | A1 |  6/2012 | Saxena et al. |

FOREIGN PATENT DOCUMENTS

| WO | 2011123306 | 10/2011 |
| WO | 2013048492 | 4/2013 |
| WO | 2013095565 | 6/2013 |
| WO | 2013095566 | 6/2013 |
| WO | 2013095568 | 6/2013 |
| WO | 2013095571 | 6/2013 |
| WO | 2013095572 | 6/2013 |

OTHER PUBLICATIONS

Madhav, Manish. "Information Security." SCRIBD, May 3, 2011. Formatted version with images available at <http://www.scribd.com/doc/54492049/56/DIFFERENCE-BASED> (52 pages).

(Continued)

*Primary Examiner* — Kisa Lewis
*Assistant Examiner* — Maung Lwin
(74) *Attorney, Agent, or Firm* — Hanley, Flight & Zimmerman, LLC

(57) ABSTRACT

Systems and method to provide secure storage are disclosed. An example method includes establishing a secure tunnel between a storage device and an agent, transferring first data from the storage device to the agent via the secure tunnel, the secure tunnel to prevent software executing in an operating system from modifying the data, and identifying a data modification by comparing the first data to second data.

15 Claims, 13 Drawing Sheets

(56) References Cited

OTHER PUBLICATIONS

Davis et al., "Chapter 10: Rootkit Detection," Hacking Exposed Malware and Rootkits, 2009 (pp. 283-318).
Kim et al., "Experiences with Tripwire: Using Integrity Checkers for Intrusion Detection," Computer Science Technical Reports, Report No. 94-012, Mar. 1994 (15 pages).
"Signing and Checking Code with Authenticode," Microsoft, Nov. 17, 2013 (22 pages).

Kim et al., "The Design and Implementation of Tripwire: A File System Integrity Checker," Computer Science Technical Reports, Report No. 93-071, Nov. 1993 (23 pages).

* cited by examiner

US 9,135,446 B2

SYSTEMS AND METHODS TO PROVIDE SECURE STORAGE

FIELD OF THE DISCLOSURE

This disclosure relates generally to storage devices, and, more particularly, to systems and methods to provide secure storage.

BACKGROUND

Today, host side applications (e.g. antivirus software) use an operating system application programming interface (API) to read in data (e.g. malware definition data) from storage to detect malware. Additionally, other storage specific commands can be used to read, write, and otherwise manage stored data. For example, vendor specific commands, SMART Command Transport (SCT), negative logical block addresses (LBA), etc., can be used to process stored data. These methods can be subverted by malware to give wrong information to a data requester. In addition, there is no provision for configuring the methods to provide application specific protection. Furthermore, data that is stored can be attacked by malware and may be copied or altered.

DETAILED DESCRIPTION

Figure 1:
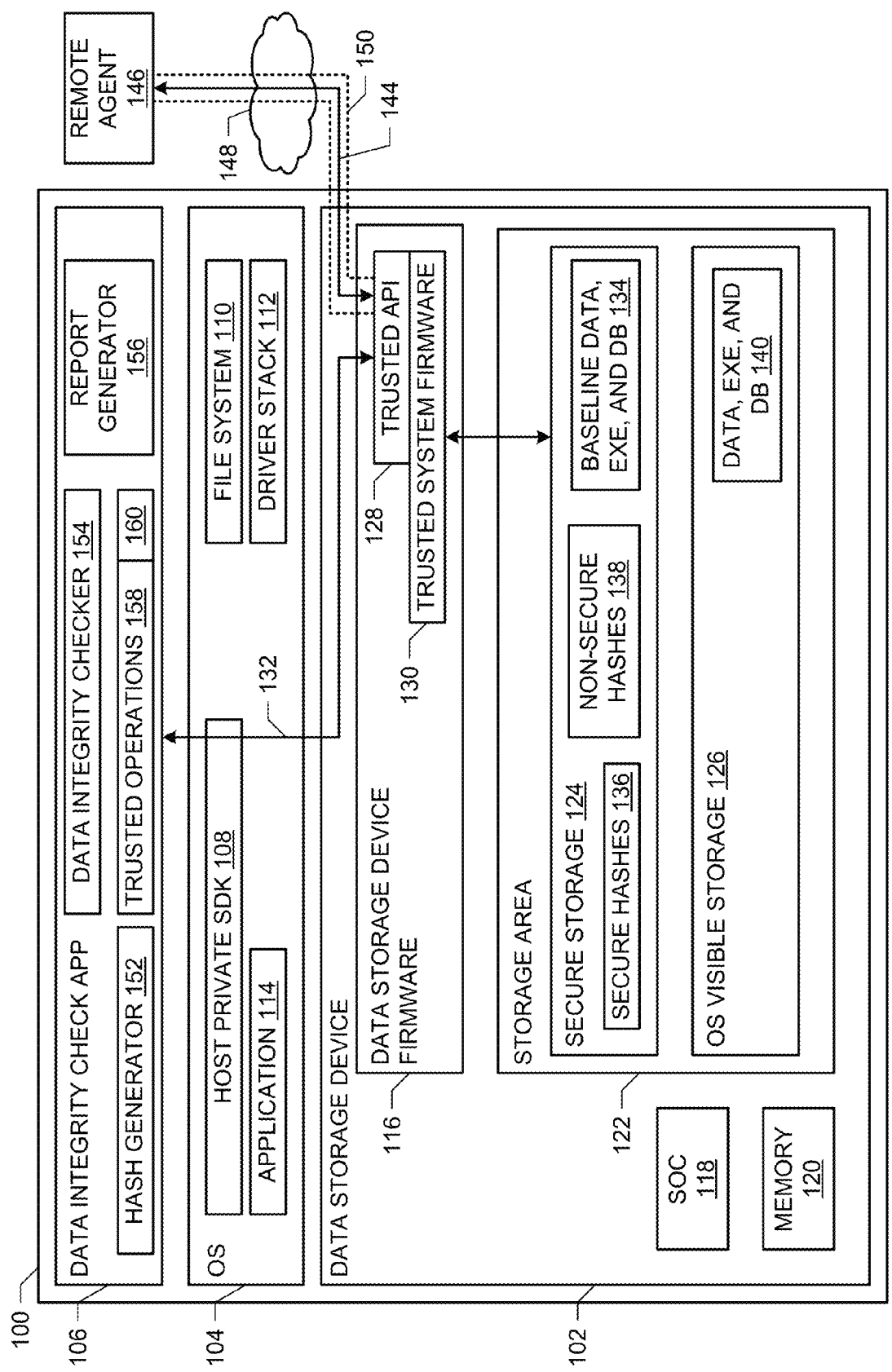
FIG. 1 is a block diagram of an example platform constructed in accordance with the teachings of this disclosure to perform secure data integrity checks.

Sophisticated malware (e.g., kernel rootkits and/or virtual rootkits) is capable of controlling virtually everything within a processing system except for the actual scheduling of processing time within the system. Malware can attack stored data and can subvert operating system calls to a storage system. Such malware can cause the return of any type of data in response to requests for data from applications (e.g., modified versions of actual data). Advanced rootkits may be able to subvert verification procedures (e.g., malware detection and/or integrity-check procedures) by presenting unmodified copies of data (e.g., files) for inspection by such procedures by, for example, masking the presence and/or contents of files.

Example methods, apparatus, and/or articles of manufacture disclosed herein create a secure tunnel between an agent (e.g., a software application) and a secure storage system within a data storage device. In some examples, the secure storage system hides the data storage by encrypting the data communicated to the secure storage system and storing data beyond the accessibility of an operating system. In some examples, a data storage device provides a trusted view of raw (e.g., unadulterated) data that is physically committed to a non-volatile medium in the data storage device via a trusted application programming interface (API) to an agent (e.g., an application running on a host CPU, a remote agent, etc.). In some such examples, firmware is used to manage the data storage device. Example firmware runs in a protected environment (e.g., a closed, isolated and/or secure environment) with a root of trust. Agents running on the host platform of the storage devices or remote agents communicate through a trusted tunnel to access the firmware and/or software used to manage the data storage device subsystems. In some examples, agents are permitted to operate (e.g., read and/or write) on raw block level information (e.g., at the file, folder or disk level) and/or on metadata based on file system information.

Example agents disclosed herein can detect malware (e.g., rootkits) by accessing the raw, unadulterated data committed to the storage media via the trusted tunnel (e.g., trusted data) and accessing the potentially-modified information via normal channels (e.g., visible data), and comparing the trusted data to the visible data. Using the trusted tunnel, agents can access unencrypted and encrypted information and/or digital signatures (e.g., hashes) of the trusted data and/or the visible data. By using the trusted tunnels, the agents can be assured that the data obtained via the trusted tunnel has not been altered (e.g., masked, hidden) by malware.

In some examples, an agent compares the raw data obtained using the trusted tunnel to baselines of trusted data. In some examples, an agent generates cryptographic hashes (e.g., signatures) of raw data obtained via the trusted tunnel to cryptographic hashes of white-listed files or data.

In some examples, an agent executing in the firmware or software executing on a secure processing element of a data storage device compares raw data to tainted data and/or baseline data. In some examples, the agent executing in the firmware or software executing on a secure processing element of a data storage device generates and compares cryptographic hashes of the raw data. In some examples, the agent executing on the data storage device receives commands via a trusted tunnel from a second agent operating on a host or a remote agent. In examples in which the agent executing on the data storage device performs the comparison and/or the generation, the agent executes in a more protected environment than an agent executing on the host. For example, firmware containing the agent can be provisioned and/or activated at the time of assembly of the data storage device, and prior to exposure of the data storage device to systems afflicted with malware and/or undesired data modification.

Example methods, apparatus, and computer readable storage media disclosed herein enable security service providers to improve the robustness, effectiveness, and/or scalability of data integrity tools and solutions.

As used herein, a "host" refers to a host processing platform of which a storage medium or device constructed in accordance with the teachings of this disclosure is a part. A host may include any combinations of hardware, software, firmware, and/or interfaces to enable the host and the subject storage device to interface.

FIG. 1 is a block diagram of an example platform 100 to perform secure data integrity checks. The example platform 100 of FIG. 1 includes a data storage device 102, an operating system 104, and an independent software application such as a data integrity checking application 106.

The operating system 104 is an operating system such as Microsoft Windows®, Apple® OS X®, etc. In the example of FIG. 1, the operating system 104 includes a private software developer's kit (SDK) 108, a file system 110, a driver stack 112, and an application 114. The example file system 110 is used to manage files that are stored in the data storage device 102. For example, the file system 110 may specify the manner in which the operating system 104 is to organize data in the storage device 102 using the driver stack 112. The example driver stack 112 is a set of driver(s) used by the operating system 104 and/or the application 114 to interact with data storage device 102 (e.g., read and write data). The driver stack 112 may include multiple software layers in the form of drivers that take on different functional roles and act as an overall interface between an application or process and one or more storage devices.

Like the data integrity checking application 106, the example application 114 of FIG. 1 is an application that runs in the operating system 104. One example of an application can be an e-mail client, a word processor, an image management application, a media management application, anti-virus software, operating system functions, and/or any other type of application. Each application may interact with the storage system 102 using the file system 110 and the driver stack 112.

The example data storage device 102 of FIG. 1 includes data storage device firmware 116, a system-on-a-chip (SOC) 118, memory 120, and a storage area 122. The data storage device 102 can be any type of storage device (e.g., solid state drives (SSD), hard disks (HD), flash drives (FD), etc.). The example system-on-a-chip 118 is a chip that includes a processor and other circuits that are used to support the data storage device 102 (e.g., by executing the firmware 116). An example implementation of the SOC 118 is further described below in FIG. 17 below. The example memory 120 is memory used to temporarily store data. The data storage device firmware 116 is firmware that may be executed operate and manage the different functions of the data storage device 102.

The example storage area 122 of FIG. 1 includes a secure storage area 124. The secure storage 124 is not visible to the operating system through the file system 110 and/or the driver stack 112. The example storage area 122 further includes a visible (e.g., OS-visible) storage 126 which, in contrast to the secure storage area 124, is visible and accessible to the OS 104 and/or the application 114. The visible storage 126 may be implemented using known storage devices.

The example data storage device firmware 116 of FIG. 1 includes a trusted application programming interface (API) 128 and a trusted system firmware 130. The trusted API 128 is used by processes executing in the operating system 104 and/or by trusted applications, such as the data integrity check application 106, to access the secure storage 124. The trusted system firmware 130 is firmware that is executed to manage the secure storage 124. The example trusted API 128 is accessed by local and/or remote entities to create a secure tunnel between that entity and the secure storage. A tunnel is used to securely transmit information (e.g., read and/or write data) between an entity and the secure storage 124. For example, the data integrity check application 106 may create a tunnel 132 via trusted API 128 and the trusted system firmware 130 to the secure storage 124.

The secure storage 124 stores data that is invisible to the operating system 104 and, therefore, cannot be accessed by low-level rootkits that do not have a root-of-trust. For example, the secure storage 124 of FIG. 1 exists at storage addresses that are beyond the maximum addressable storage available to the operating system 104 and/or applications 114 that are accessing the data storage device 102 via the file system 110 and driver stack 112. The example secure storage 124 may be physically separate from the visible storage 126 or may be a partition of the visible storage 126.

In the example of FIG. 1, the secure storage 124 stores important data, such as data that may be used to identify malicious changes and/or non-malicious but undesired changes to data. For example, the secure storage 124 stores baseline data 134 (e.g., data files, executables, and/or databases), secure hashes 136 of the baseline data 134, and/or non-secure hashes 138 of the baseline data 134. The example secure hashes 136 and the non-secure hashes 138 are hashes or signatures performed by the example data integrity check application 106. The secure hashes 136 are generated based on secure transmission of the baseline data 134 from the secure storage 124 to the data integrity check application 106 and secure transmission of the secure hashes 136 from the data integrity check application 106 to the secure storage 124 via the tunnel 132, the trusted API 128, and the trusted system firmware 130. In contrast, the non-secure hashes 138 are generated based on data that is potentially subject to manipulation (e.g., data 140 such as files, executables, and/or databases store in the visible storage 126).

As described above, the data in the secure storage 124 is not visible to an application except through the trusted API 128. In the example of FIG. 1, the data integrity check application 106 accesses the secure storage 124 using the tunnel 132 (via the private SDK 108, the trusted API 128, and the trusted system firmware 130). The example data integrity check application 106 is a trusted agent that is permitted to securely read data from and write data to the secure storage area 124. The data stored in the secure storage 124 (e.g., the baseline files 134, the secure hashes 136, and the non-secure hashes 138) is invisible to the OS 104 and to application(s) 114 executing in the operating system 104. Therefore, neither the OS 104 nor the application 114 can view, alter, or delete the data stored in secure storage 124. Additionally, malware executing at or above the OS 104 level cannot view, alter, or delete the data stored in the secure storage 124. As a result, the example data storage device 102 provides a trusted view of baseline data (e.g., files, blocks, and/or other units of data) and/or hashes (signatures) of data for comparison to potentially tainted data or hashes of such data. An agent can then use this comparison to identify the presence of malicious modifications to data and/or non-malicious but undesired modifications to data (e.g., by searching for signature changes to data indicative of such modifications).

The example trusted API 128 may form the tunnel 132 by, for example: (1) a mailboxing scheme in which logical block addresses are set aside for communication between the agent (e.g., the data integrity check application 106) and the data storage device 102 (e.g., the trusted API 128), and/or (2) trusted sends (e.g., messages sending data from a host to a storage device according to a specified security protocol, messages sending data from a host to a storage device according to Trusted Computing standards, and/or messages sending data from a host to a storage device using another method of verifying trust) and trusted receives (e.g., messages retrieving data from a storage device according to a specified security protocol and corresponding to a trusted send, messages retrieving data from a storage device according to Trusted Computing standards, and/or messages retrieving data from a storage device using another method of verifying trust) that are supported by the data storage device 102 (e.g., the trusted API 128 and/or the trusted system firmware 130).

In the example of FIG. 1, the tunnel 132 is formed between the trusted API 128 and the agent 106 running on the host (e.g., the same computer or other platform) that includes the data storage device 102. In some other examples, a trusted tunnel 144 may be formed between the data storage device (e.g., via the trusted API 128) and a remote agent 146 (e.g., a remote server) that is coupled to the platform 100 via a network 148. In some such examples, the trusted system firmware 130 (via the trusted API 128) creates a network connection 150 that is used to communicate information with the remote agent 146. For example, the trusted storage firmware 130 may create the trusted tunnel 144 such that the remote agent 146 may read and/or write data to the secure storage 124 of the data storage device 102. By establishing the trusted tunnel 144 to a remote agent 146, a remote agent 146 such as a network monitor may monitor malicious and/or undesired changes to data on multiple data storage devices, including the data storage device 102, that are connected to the network 148.

The example data integrity check application 106 of FIG. 1 performs data integrity checks of the data stored on the data storage device 102. The example data integrity check application 106 includes a hash generator 152, a data integrity checker 154, a report generator 156, and trusted operations 158.

The example hash generator 152 generates cryptographic hashes of the baseline data 134 (e.g., secure hashes 136) and/or cryptographic hashes of the visible data 140 (e.g., non-secure hashes 138). The data integrity checker 154 compares the secure hashes 136 to the non-secure hashes 138 to determine whether any changes have occurred. Additionally or alternatively, the data integrity checker 154 compares the baseline data 134 to the visible data 140 to determine whether changes have occurred. The example hash generator 152 and/or the example data integrity checker 154 may operate periodically, aperiodically, in response to an event, on demand, and/or at any other time to identify changes to the data 140.

The example data integrity check application 106 (e.g., the hash generator 152 and/or the data integrity checker 154) uses the example trusted operations 158 to securely communicate with the secure storage 124 (e.g., via the tunnel 132, the trusted API 128, and/or the trusted system firmware 130). Example trusted operations 158 include a trusted read operation and a trusted write operation. In the example of FIG. 1, a trusted read or trusted write means that the identity of the entity requesting the operation is known and trusted. Trust may be established by requiring the data integrity check application 106 to sign trusted read requests and/or trusted write requests using a trusted signature 160. Example methods to securely communicate data between the data integrity check application 106 and the secure storage 124 via the tunnel 132 are described below.

The example hash generator 152 may use the trusted operations 158 to read the baseline data 134 from the secure storage and/or to write the secure hashes 136 and/or the non-secure hashes 138 to the secure storage 124. Additionally or alternatively, the data integrity checker 154 may use the trusted operations 158 to read the baseline data 134, the secure hashes 136, and/or the non-secure hashes 138 from the secure storage 124.

The example report generator 156 of FIG. 1 generates reports based on information from the data integrity checker 154. To generate the reports, the report generator 156 may apply rules to the differences identified by the data integrity checker 154 between raw data and/or cryptographic hashes. Example rules may include differences between data that match signature behaviors of known malware. The example report generator 156 provides generated reports for system administrators and/or managers to evaluate the differences in data and/or to initiate corrective action.

Figure 2:
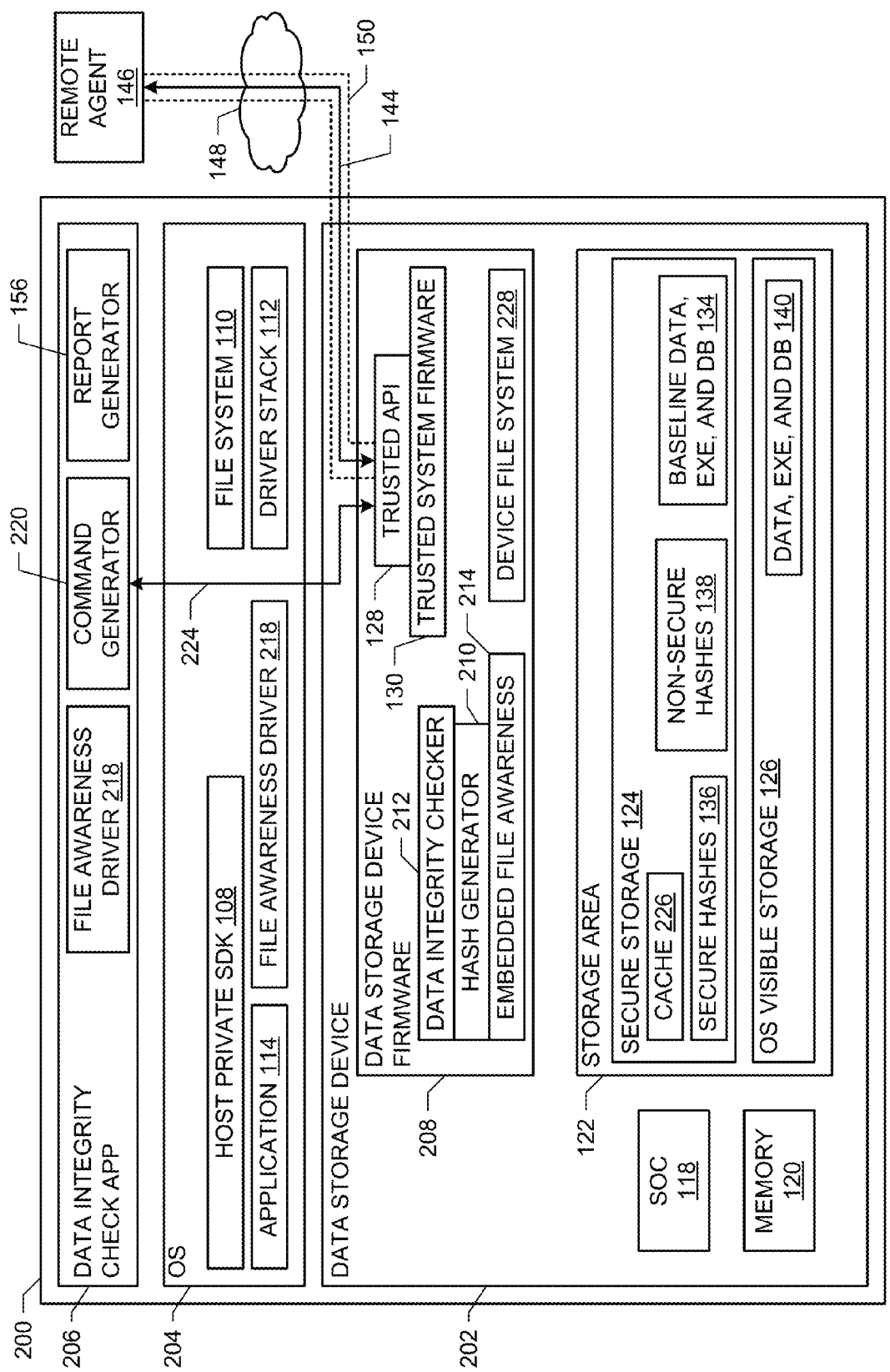
FIG. 2 is a block diagram of another example platform constructed in accordance with the teachings of this disclosure to perform secure data integrity checks.

FIG. 2 is a block diagram of another example platform 200 to perform secure data integrity checks. The example platform 200 of FIG. 2 includes a data storage device 202, an operating system 204, and a data integrity check application 206. Compared to the platform 100 of FIG. 1, the example platform 200 performs more data operations (e.g., hashing data, comparing data to baseline data and/or secure hashes to non-secure hashes, etc.) on the data storage device 202 than on the data storage device 102.

The example data storage device 202 of FIG. 2 includes the example SOC 118, the example memory 120, and the example storage area 122 of FIG. 1. The example storage area 122 includes the example secure storage 124 (which stores the baseline data 134, the secure hashes 136, and the non-secure hashes 138, among other things) and the OS-visible storage 126 of FIG. 1 (which stores visible data 140).

The example data storage device 202 further includes data storage device firmware 208. The example data storage device firmware 208 includes the trusted API 128 and the trusted system firmware 130 of FIG. 1. Unlike the data storage device firmware 116 of FIG. 1, the example data storage device firmware 208 of FIG. 2 further includes a hash generator 210, a data integrity checker 212, and embedded file awareness firmware 214.

The example hash generator 210 of FIG. 2 may be similar or identical to the example hash generator 152 of FIG. 1. In particular, the example hash generator 210 obtains copies of data (e.g., baseline data 134 and/or visible data 140) and generates hashes or signatures of the data to generate secure hashes 136 and/or non-secure hashes 138. The secure hashes 136 and/or non-secure hashes 138 may be securely stored in the secure storage 124 (e.g., via the trusted system firmware 130).

The example data integrity checker 212 of FIG. 2 may be similar or identical to the example data integrity checker 154 of FIG. 1. In particular, the example data integrity checker 212 executes securely in the data storage device firmware 208 and compares the secure hashes 136 to the non-secure hashes 138 and/or compares the baseline data 134 to the visible data 140 to determine whether changes have occurred.

The example embedding file awareness firmware 214 translates raw information (e.g., bits and bytes) for use by the data storage device firmware 208. The example OS 204 and the example data integrity check application 206 include file awareness drivers 218. The file awareness drivers 218 enable the OS 204 and/or the data integrity check application 206 to communicate file structure information to the data storage device firmware 208 to instruct the embedded file awareness firmware 214 how to read and translate the types of files present in the secure storage 124 and/or the visible storage 126. As a result, the data storage device firmware 208 (e.g., the hash generator 210, the data integrity checker 212) may perform operations on the data 134-140 without transferring the data to the OS 204 and/or the data integrity check application 206 for interpretation of the raw bits and bytes.

The example OS 204 of FIG. 2 further includes the private SDK 108, the file system 110, the driver stack 112, and the application 114 of FIG. 1. In addition to the file awareness drivers 218, the example data integrity check application 206 of FIG. 2 includes a command generator 220 and the report generator 156 of FIG. 1.

The example command generator 220 of FIG. 2 generates and transmits commands to the data storage device firmware 208 via a secure tunnel 224 and the trusted API 128. By using the secure tunnel 224, the example command generator 220 may provide trusted commands to the example data storage device firmware 208, including commands to read and/or write data via the embedded file awareness firmware 214, to generate hashes of particular data and/or locations in the secure storage 124 and/or in the visible storage 126, to provide definitions or signatures of changes to data to the data integrity checker 212, and/or to provide other secure commands and/or instructions. Similarly, the example command generator 220 may receive data integrity check information from the data integrity checker 212 via the secure tunnel 224 and the trusted API 128.

In some examples, the embedded file awareness firmware 214 may receive commands and/or file information from the remote agent 146 via the secure tunnel 144, the network 148, and the network connection 150 of FIG. 1.

The embedded file awareness firmware 214 receives communications from an agent (e.g., the application 114, the data integrity check application 206) via the trusted API 128 to provide the awareness of the file system 110 used by the OS 204 to the data storage device firmware 208. The example embedded file awareness firmware 214 includes a device file system 228 to support a subset of services provided by the OS file system 110. The example embedded file awareness firmware 214 enables the data storage device firmware 208 to perform data integrity checks on data in the storage device (e.g., a malware scan), perform trusted operations in the storage device including a computation of hashes or a comparison of hash signatures, access a backup of the host file system 110 stored on the data storage device 202, and/or perform other file system operations.

To provide file awareness, a set of synchronizing messages is sent between the OS 204 and/or the data integrity check application 206 via the file awareness driver 218. The file awareness driver 218 is authorized to communicate with the embedded file awareness firmware 214 (e.g., via the trusted API 128). In the example of FIG. 2, a master copy of the file system is resident in the host (e.g., the file system 110 in the OS 204). The file awareness driver 218 initiates the following set of messages to the data storage device firmware 208.

An Init_filesystem(file system) message causes the embedded file awareness firmware 214 to initialize a structure in the storage area 122 that refers to the specified host "file system." An example Init_filesystem message includes "Init_filesystem(UFS1)."

A Set_fileupdate(file system, filename, properties, <LBA list>) message provides a file system, a file name within the specified file system, properties of the specified file, and an ordered list of logical block addresses containing the data associated with the specified file. The Set_fileupdate message results in updating the file system on the storage device with a file name-to-logical block address mapping for the specified file name. An example Set_fileupdate message includes "Set_fileupdate(UFS1, explorer.exe, properties(hrwx,dr), <10, . . . 112>)," where the "hrwx" argument indicates that the host (e.g., the OS 204, the application 206) has permissions include reading, writing, and executing the file. The "dr" argument indicates that the storage device 202 has permissions including reading the file.

A Get_fileupdate(file system, filename) message provides a file system and a file name within the file system. The Get_fileupdate(file system, filename) message results in the data storage device 202 returning the data associated with the specified file to the host (e.g., the OS 204, the application 206). The returned data includes changes to the specified file that are cached in the storage device 202 (e.g., in a cache 226). The size of the cache 226 may be based on expected usages of the storage device aware files. An example Get_fileupdate message includes "Get_fileupdate(UFS1, results.out)." The file system field of the Get_fileupdate message provides a pointer to a file system that is referenced by the message to the embedded file awareness firmware 214 (e.g., to distinguish between multiple file systems that may be present on the data storage device 202).

The device file system organization is stored at the data storage device 202. The files in the example file system are organized as a searchable collection of file names. Each record (e.g., file name) in the collection of file names point to the metadata associated with the respective record. The collection of file names may be implemented as a flat data structure with a sequential search to find a desired file and/or as an indexed data structure with binary search support to access and/or update a file.

The example file awareness drivers 218 communicate with the embedded file awareness firmware 214 via the trusted API 128 and the secure tunnel 224. Therefore, the messages and responses are communicated between the file awareness drivers 218 communicate with the embedded file awareness firmware 214 in a trusted environment that cannot be accessed by malware. The example server may be used for provisioning keys into the storage device for authentication and encryption purposes, setting and receiving data from the secure storage, and setting and receiving trusted block level data when the ISV performs a remote scan.

In a client system such as a laptop computer or a tablet computer, communication between the file awareness drivers 218 and the embedded file awareness firmware 214 may be implemented using trusted-ATA commands over SATA and/or using vendor-unique commands over SATA. In client systems such as a smartphone, the communications may be implemented using trusted-ATA commands over embedded MultiMediaCard (eMMC). Other communication implementations may additionally or alternatively be used.

As used herein, using the trusted tunnels 132, 144, 224 includes using appropriate ones of the trusted operations 158, the trusted signature 160, the trusted API 128, the trusted system firmware 130, and/or private SDK 108, and/or any other intermediate pathways, operations, and/or interfaces to securely communicate via the tunnels 132, 144, 224.

While an example manner of implementing the platforms 100, 200 have been illustrated in FIGS. 1, 2, 5-8, 12, and 13, one or more of the elements, processes and/or devices illustrated in FIGS. 1, 2, 5-8, 12, and 13 may be combined, divided, re-arranged, omitted, eliminated and/or implemented in any other way. Further, any or all of the example data storage devices 102, 202, example operating systems 104, 204, example data integrity check applications 106, 206, example private SDK 108, example file system 110, example driver stack 112, example application 114, example data storage device firmware 116, 208, example system-on-a-chip 118, example memory 120, example storage area 122, example secure storage 124, example visible storage 126, example trusted API 128, example trusted system firmware 130, example secure tunnels 132, 144, 224, example data 134, example secure hashes 136, example non-secure hashes 138, example remote agent 146, example hash generators 152, 210, example data integrity checkers 154, 212, example report generator 156, example trusted operations 158, example trusted signature 160, example embedded file awareness 214, 1200, example file awareness drivers 218, example command generator 220, example cache 226, example device file system 228, example agents 502, 602, 702, 802, example secure storage devices 504, 604, example LBAs 506, 508, 706, 806, example file awareness message handler 1202, example device level file system 1204, example device file properties 1302, example device file tables 1304, example device file system interface 1306, example NAND management subsystem 1308, example device file system cache 1310 and/or, more generally, the example platforms 100, 200 of FIGS. 1 and/or 2 may be implemented by hardware, software, firmware and/or any combination of hardware, software and/or firmware. Thus, for example, any or all of example data storage devices 102, 202, example operating systems 104, 204, example data integrity check applications 106, 206, example private SDK 108, example file system 110, example driver stack 112, example application 114, example data storage device firmware 116, 208, example system-on-a-chip 118, example memory 120, example storage area 122, example secure storage 124, example visible storage 126, example trusted API 128, example trusted system firmware 130, example secure tunnels 132, 144, 224, example data 134, example secure hashes 136, example non-secure hashes 138, example remote agent 146, example hash generators 152, 210, example data integrity checkers 154, 212, example report generator 156, example trusted operations 158, example trusted signature 160, example embedded file awareness 214, 1200, example file awareness drivers 218, example command generator 220, example cache 226, example device file system 228, example agents 502, 602, 702, 802, example secure storage devices 504, 604, example LBAs 506, 508, 706, 806, example file awareness message handler 1202, example device level file system 1204, example device file properties 1302, example device file tables 1304, example device file system interface 1306, example NAND management subsystem 1308, example device file system cache 1310 and/or, more generally, the example platforms 100, 200 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example data storage devices 102, 202, example operating systems 104, 204, example data integrity check applications 106, 206, example private SDK 108, example file system 110, example driver stack 112, example application 114, example data storage device firmware 116, 208, example system-on-a-chip 118, example memory 120, example storage area 122, example secure storage 124, example visible storage 126, example trusted API 128, example trusted system firmware 130, example secure tunnels 132, 144, 224, example data 134, example secure hashes 136, example non-secure hashes 138, example remote agent 146, example hash generators 152, 210, example data integrity checkers 154, 212, example report generator 156, example trusted operations 158, example trusted signature 160, example embedded file awareness 214, 1200, example file awareness drivers 218, example command generator 220, example cache 226, example device file system 228, example agents 502, 602, 702, 802, example secure storage devices 504, 604, example LBAs 506, 508, 706, 806, example file awareness message handler 1202, example device level file system 1204, example device file properties 1302, example device file tables 1304, example device file system interface 1306, example NAND management subsystem 1308, and/or example device file system cache 1310 are hereby expressly defined to include a tangible computer readable storage medium such as a memory, DVD, CD, Blu-ray, etc. storing the software and/or firmware. Further still, the example platforms 100, 200 of FIGS. 1 and/or 2 may include one or more elements, processes and/or devices in addition to, or instead of, those illustrated in FIGS. 1 and/or 2, and/or may include more than one of any or all of the illustrated elements, processes and devices.

Flowcharts representative of example machine readable instructions for implementing the platforms 100, 200 FIGS. 1 and/or 2 are shown in FIGS. 3, 4, 9-11, and 14. In these examples, the machine readable instructions comprise programs for execution by a processor such as the processor 1512 shown in the example processing platform 1500 discussed below in connection with FIG. 15. The programs may be embodied in software stored on a tangible computer readable storage medium such as a CD-ROM, a floppy disk, a hard drive, a digital versatile disk (DVD), a Blu-ray disk, or a memory associated with the processor 1512, but the entire programs and/or parts thereof could alternatively be executed by a device other than the processor 1512 and/or embodied in firmware or dedicated hardware. Further, although the example programs are described with reference to the flowcharts illustrated in FIGS. 3, 4, 9-11, and 14, many other methods of implementing the example platforms 100, 200 may alternatively be used. For example, the order of execution of the blocks may be changed, and/or some of the blocks described may be changed, eliminated, or combined.

As mentioned above, the example processes of FIGS. 3, 4, 9-11, and 14 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device and/or storage disk in which information is stored for any duration (e.g., for extended time periods, permanently, brief instances, for temporarily buffering, and/or for caching of the information). As used herein, the term tangible computer readable storage medium is expressly defined to include any type of computer readable storage excluding propagating signals and waves. Additionally or alternatively, the example processes of FIGS. 3, 4, 9-11, and 14 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage device and/or storage disk in which information is stored for any duration (e.g., for extended time periods, permanently, brief instances, for temporarily buffering, and/or for caching of the information). As used herein, the term non-transitory computer readable medium is expressly defined to include any type of computer readable medium excluding propagating signals and waves. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 3:
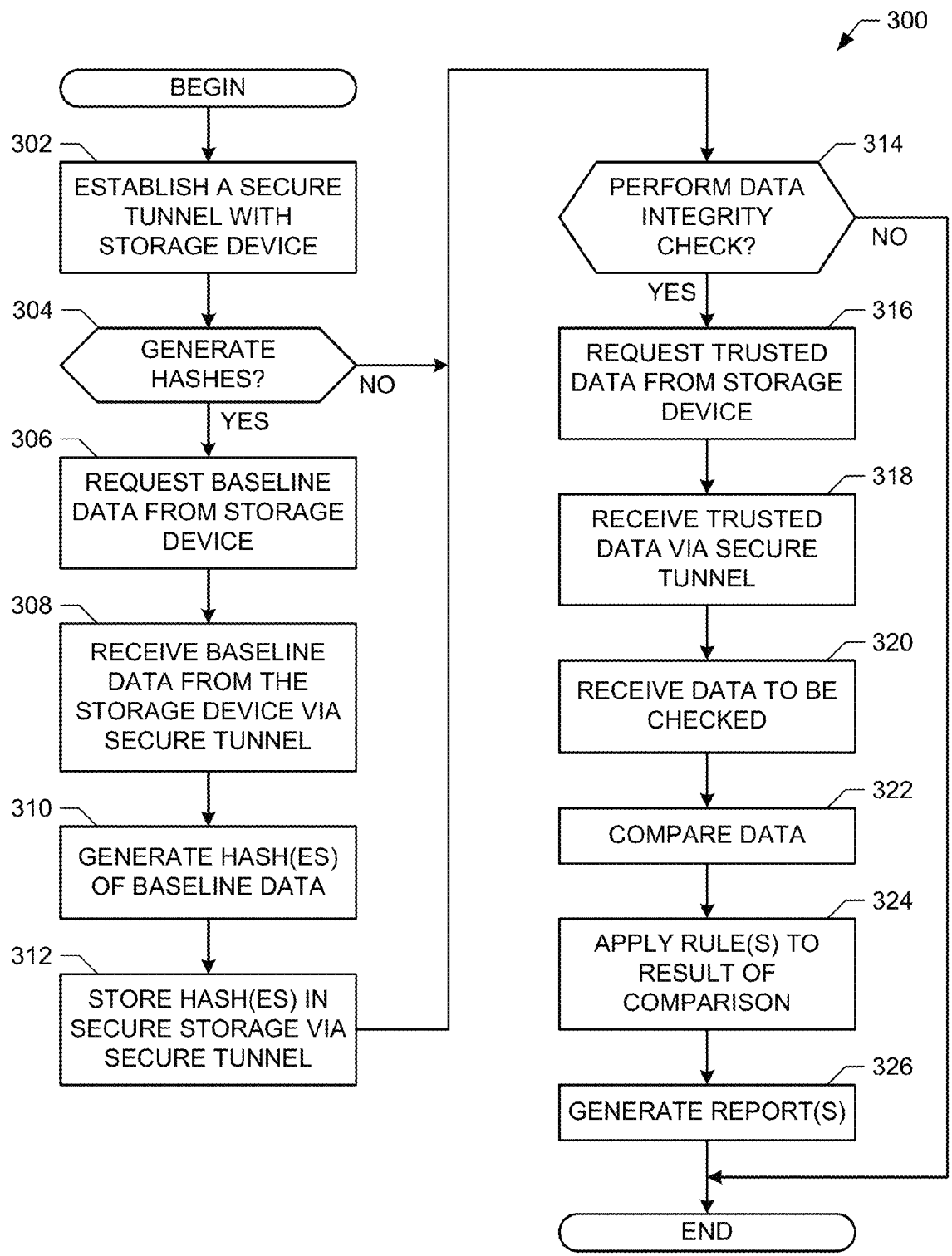
FIG. 3 is a flowchart representative of example machine readable instructions which may be executed to implement the example platform of FIG. 1 to perform secure data integrity checks.

FIG. 3 is a flowchart representative of example machine readable instructions 300 which may be executed to implement the example platform 100 of FIG. 1 to perform secure data integrity checks. The example instructions 300 of FIG. 3 are performed by an agent such as the example data integrity check application 106 in cooperation with the example data storage device 102 of FIG. 1.

The example instructions 300 begin by establishing a secure tunnel (e.g., the secure tunnel 132, 144 of FIG. 1 with the data storage device 102 (e.g., via the trusted operations 158, the trusted signature 160, and/or the trusted API 128 of FIG. 1) (block 302). The example secure tunnel 132 enables the application 106 to access the secure storage 124 via the trusted system firmware 130.

The example hash generator 152 determines whether to generate hashes (e.g., hashes of data to be used for data integrity checks) (block 304). Generating hashes may be performed, for example, before and/or after events such as updates to software or data (e.g., files). If the hash generator 152 is to generate hashes (block 304), the example hash generator 152 requests baseline data (e.g., baseline data 134 of FIG. 1) from the data storage device 102 (block 306). The example request may be made via the secure tunnel 132, the trusted API 128, and the trusted operations 158. The example hash generator 152 receives the requested baseline data 134 from the storage device via the secure tunnel 132 (block 308). By sending the request and receiving the baseline data 134 via the secure tunnel 132, the example application 106 may trust the received baseline data (e.g., rely on the baseline data being authentic and/or not affected by malware).

The example hash generator 152 generates a hash of the received baseline data 134 (block 310). The hash generator 152 stores the generated hash in the secure storage 124 via the secure tunnel 132 (e.g., as a secure hash 136) (block 312). As a result, the secure hash 136 is not accessible to malware operating at or above the kernel level and may be trusted for future operations such as data integrity checks.

After storing the hash in the secure storage 124 (block 312), or if the application 106 does not generate hashes (block 304), the example data integrity checker 154 determines whether a data integrity check is to be performed (block 314). If the example data integrity checker 154 is to perform a data integrity check (block 314), the data integrity checker 154 requests trusted data (e.g., a secure hash 136) from the storage device 102 (e.g., from the secure storage 124 via the trusted operations 158, the secure tunnel 132, the trusted API 128, and/or the trusted firmware 130) (block 316). The example data integrity checker 154 receives the trusted data via the secure tunnel 132 (block 318).

The example data integrity checker 154 also receives data to be checked (block 320). The data to be checked may be representative data such as a hash for data to be checked for malicious and/or non-malicious but undesired changes. The example data integrity checker 154 compares the trusted data to the untrusted data (block 322). For example, the data integrity checker 154 may compare a secure hash 136 to a non-secure hash 138. Additionally or alternatively, the data integrity checker 154 may compare baseline data 134 to visible data 140 (e.g., in the visible storage 126 of FIG. 1).

The example data integrity checker 154 applies rule(s) to the result of the comparison (block 324). Example rules may include malware definitions such as signatures that may be present when malware is on a system. Multiple comparisons may be necessary for some rules and/or multiple rules may be necessary to detect malware. The example report generator 156 of FIG. 1 generates report(s) based on the application of the rule(s) to the comparison (block 326). For example, the report generator 326 may generate and issue a report to a system administrator when malware or other undesired data changes are detected.

After generating the report(s) (block 326) or if a data integrity check is not performed (block 314), the example instructions 300 may end. In some examples, the blocks 304-312 and/or the blocks 314-326 may be iterated to generate multiple hashes and/or to perform data integrity checks on multiple units of data (e.g., data files, blocks of data, etc.).

Figure 4:
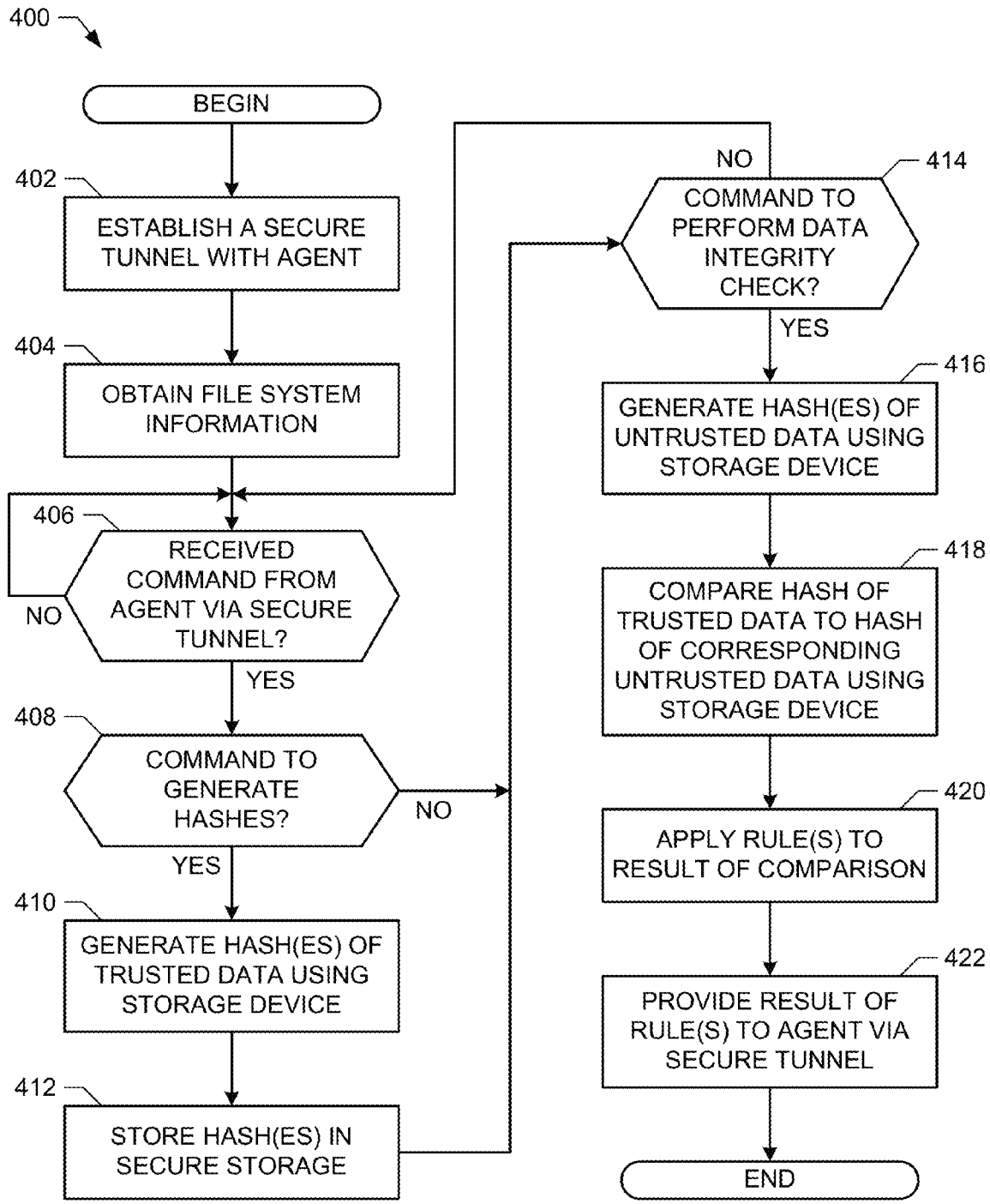
FIG. 4 is a flowchart representative of alternative example machine readable instructions which may be executed to implement the example platform of FIG. 2 to perform secure data integrity checks.

FIG. 4 is a flowchart representative of alternative example machine readable instructions 400 which may be executed to implement the example platform 200 of FIG. 2 to perform secure data integrity checks. The example instructions 400 of FIG. 4 are performed by a data storage device such as the example data storage device 202 (e.g., the data storage device firmware 208 and the SoC 118) in cooperation with an example agent (e.g., the data integrity check application 206) of FIG. 2.

The example data storage device 202 begins by establishing a secure tunnel (e.g., the secure tunnel 224) with an agent (e.g., the data integrity check application 206) (block 402). The example secure tunnel 224 may be established between the example command generator 220 and the example trusted API 128 of FIG. 2. The example data storage device 202 (e.g., via the embedded file awareness firmware 214) obtains file system information (e.g., file system information for the storage area 122, the secure storage 124, and/or the visible storage 126) (block 404). The file system information informs the embedded file system awareness firmware 214 how to interpret the files stored in the storage area 122.

The example trusted storage firmware 130 of FIG. 2 determines whether a command has been received (block 406). Commands may be received from the command generator 220 of FIG. 2 via the secure tunnel 224. If a command has not been received (block 406), control loops to block 406 to continue monitoring for a command.

When a command is received (block 406), the example hash generator 210 determines whether the command is a command to generate a hash (block 408). Commands to generate hashes may be received from the example application 206 when, for example, a file or program has been updated and a new representative hash must be generated. In some examples, the command specifies trusted data(s) (e.g., in the secure storage 124) for which a hash is to be generated. If a command to generate a hash is received (block 408), the example hash generator 210 generates a hash of trusted data (block 410). The example hash generator 210 then stores the generated hash in the secure storage 124 (block 412).

After storing the hash (block 412), or if a command to generate a hash has not been received (block 408), the example data integrity checker 212 of FIG. 2 determines whether a command to perform a data integrity check has been received (block 414). A command to perform a data integrity check may specify particular data to be checked and/or may cause a data integrity check of a set or subset of data. If a data integrity check command has not been received (block 414), control returns to block 406 to monitor for a received command.

If a command to perform a data integrity check is received (block 414), the example hash generator 210 generates a hash of untrusted data (e.g., data visible to the operating system 204) (block 416). The example data integrity checker 212 compares the hash of the trusted data to the hash of the untrusted data (block 418). The example data integrity checker 212 applies rule(s) to the result of the comparison (block 420). The rule(s) may identify changes indicating the presence of malware or other undesired changes to the trusted data. The example data integrity checker 212 provides the result of the rule(s) (and/or the result of the comparison of the data) to the agent 206 via the secure tunnel 224 (block 422). The agent 206 may, for example, generate a report based on the rule(s).

To perform blocks 410, 412, and/or 416-422, the example hash generator 210 and the example data integrity checker 212 may use the embedded file system firmware 214 to interpret the files in the storage area 122.

After providing the result (block 422), the example instructions 400 may end. In some examples, the data storage device 202 of FIG. 2 iterates the instructions to continue calculating hashes and/or performing data integrity checks.

Figure 5:
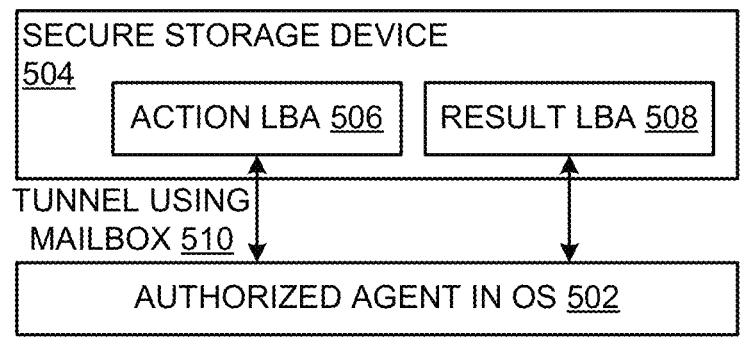
FIG. 5 illustrates an example agent to communicate information to a secure storage system using a tunnel in accordance with the teachings of this disclosure.

FIG. 5 illustrates an example agent 502 to communicate information to a secure storage system 504 using a tunnel 510. An authorized agent 502 (that is executing the operating system such as the operating systems 104, 204 of FIGS. 1 and/or 2) securely communicates with a secure storage system 504 using a mailboxing-based tunnel 510. For example, the secure storage system 504 may be the data storage devices 102, 202 as described in FIGS. 1 and/or 2. In some examples, the agent 502 is authorized to communicate with secure storage 504. The example tunnel 510 of FIG. 5 is based on a mailboxing scheme, in which requested actions of the secure storage system 204 are written to a dedicated area in the secure storage system 504 referred to as the action logical block address (LBA) 506. Results of requested actions are communicated using a results LBA 508, which is a dedicated area of secure storage system 504. In some examples, the LBAs are beyond an addressable storage (e.g., the OS-visible storage 126 of FIGS. 1 and/or 2). In these examples, a storage address that is below an upper storage address can be seen by an operating system such as operating systems 104, 204 of FIGS. 1 and/or 2. Both of the LBAs 506, 508 are above the address space that is accessible by an operating system, so the LBAs 506, 508 (and, thus, the data stored at the LBAs) are not visible to the operating system 104, 204.

The example agent 502 of FIG. 5 can access the data and/or write to the data from these LBAs by using a tunnel 510. The example action LBA 506 is used to communicate action requests to the storage system 504. Example action requests include write, read, and/or tunnel configuration commands, and/or other commands for accessing and/or managing data in a storage system. The results of the commands are stored in the results LBA 508.

In an operational example, the agent 502 is to write data to the secure storage system 504. The example agent 502 writes a write command to the action LBA 506 and writes the data that the agent 502 wishes to store to the results LBA 508. The secure storage system 504 processes the command stored in the action LBA 506. Based on the command, the secure storage system 504 stores the subject data of the command to the location indicated in the action LBA 506 by redirecting the subject data being written to results LBA 508. In another example, the agent 502 wishes to read data from secure storage system 504. The agent 502 writes the read command into the action LBA 506. The example secure storage system 504 processes the read command and redirects the data to be read as if the data were to be delivered from the result LBA 508. The example agent 502 reads the data from result LBA 508 to complete the read command. In some examples, the mailboxing-based tunnel 510 can be built upon different storage protocols (e.g., trusted send/receive, overloaded write/read, Common Storage Management Interface (CSMI), etc.).

Figure 6:
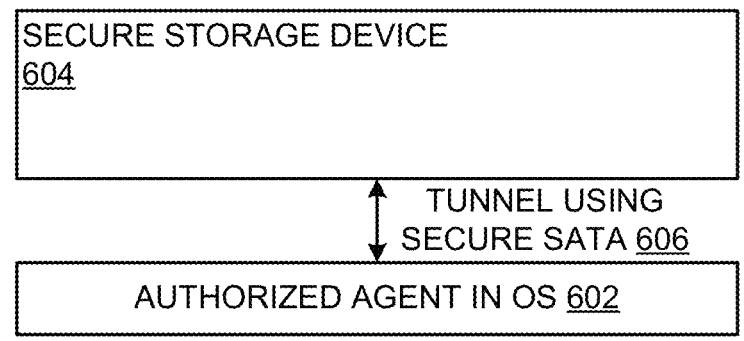
FIG. 6 illustrates another example agent to communicate information to a secure storage system using a tunnel in accordance with the teachings of this disclosure.

FIG. 6 illustrates another example agent 602 to communicate information to a secure storage system 604 using a tunnel 606. In the example of FIG. 6, the tunnel 606 is based on a trusted send messaging system with the agent 602. The example agent 602 of FIG. 6 is authorized in an OS (e.g., the operating systems 104, 204) to securely communicate with the secure storage system 604 using a tunnel 606 based on a trusted send facility. In some examples, the tunnel 606 is based on the trusted send facility of secure SATA. In such examples, the agent 602 negotiates a session key with the secure storage system 604, where the session key can be used for transmitting messages between the agent 602 and the secure storage system 604 (e.g., via the trusted API 128 of FIGS. 1 and/or 2). In some examples, the negotiated session key is used to encrypt/decrypt the data stored in each message transmitted using the tunnel 606.

Figure 7:
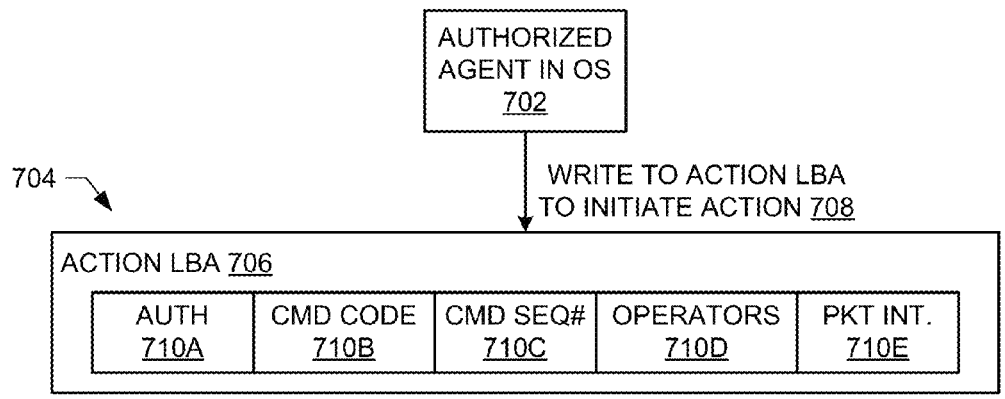
FIG. 7 illustrates an example communication from an agent to a secure storage system using mailboxing in accordance with the teachings of this disclosure.

FIG. 7 illustrates an example communication from an agent 702 to a secure storage device 704 (e.g., the secure storage area 124 of FIGS. 1 and/or 2, the secure storage system 504 of FIG. 5) using mailboxing. In the example of FIG. 7, the agent 702 is authorized by an OS to write a command to an action LBA 706 to initiate an action 708 with the secure storage device 704. In the example of FIG. 7, the action written to action LBA 706 contains an authorization message field 710A, a command code 710B, a command sequence number 710C, operators 710D, and a package integrity field 710E. The example authorization message field 710A includes data that is used to identify and authorize the action requested by the agent 702. For example, the authorization message field 710A of FIG. 7 includes a private key that is specific to the data communicated between the agent 702 and the secure storage device 704.

The example command code 710B is a code that indicates what type of command is being written to the action LBA 706. For example, the command code 710B can be a code that writes, reads, configures, and/or another command code used to indicate another type of action to access and/or manage the data stored in the secure storage device 704. The example command sequence number 710C is a number that can be used to identify a specific command message. The example operators 710D are flags or bits that signal firmware in the secure storage device 704 (e.g., the data storage device firmware 116, 208 of FIGS. 1 and/or 2) to take some kind of specific action associated with a given command type. The example packet integrity field 710E is data that is used to ensure the integrity of the data written to the action field 710A. For example, the data in the packet integrity field 710E may be a checksum or some other form of data that ensures that the data was correctly written to the action LBA 706.

Figure 8:
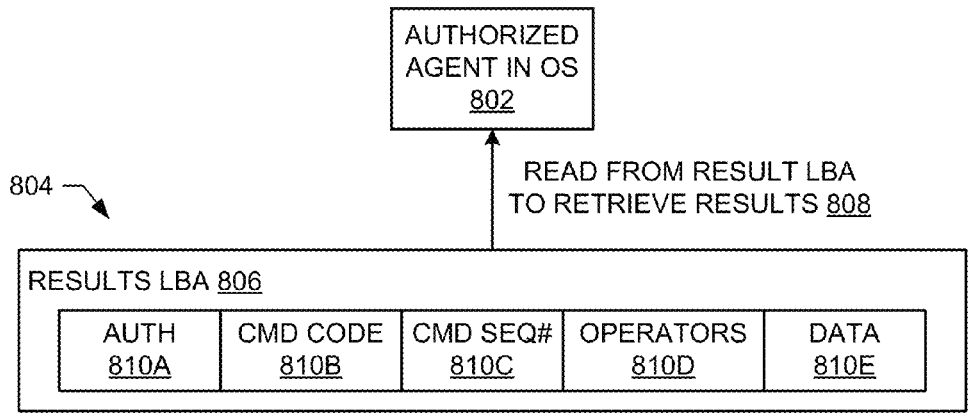
FIG. 8 illustrates an example communication from a secure storage system to an agent using mailboxing in accordance with the teachings of this disclosure.

FIG. 8 illustrates another example communication from a secure storage device 804 to an agent 802 using mailboxing. The example agent 802 is authorized by an OS to read the data from a results LBA 806 in the secure storage device 804 to retrieve the results 808 from an action written to an action LBA (e.g., the action LBA 706 of FIG. 7). The example results LBA 806 includes an authorization message 810A, a command code 810B, a command sequence 810C, operators 810D, and data 810E. The example authorization message 810A, the example command code 810B, the example command sequence 810C, and the example operators 810D perform the same function as described above with reference to FIG. 7. The example data 810E is used to communicate data that results from the action that was written to the action LBA 706. The example data may be retrieved from the results LBA 806 differently (e.g., directly through the secure tunnel, etc.). For example, the data 810E may include the data that is retrieved from a read. In some examples, the data 810E can include other data such as a return code, error code or other type of data that would be communicated as a result of command written to the action LBA 706.

Figure 9:
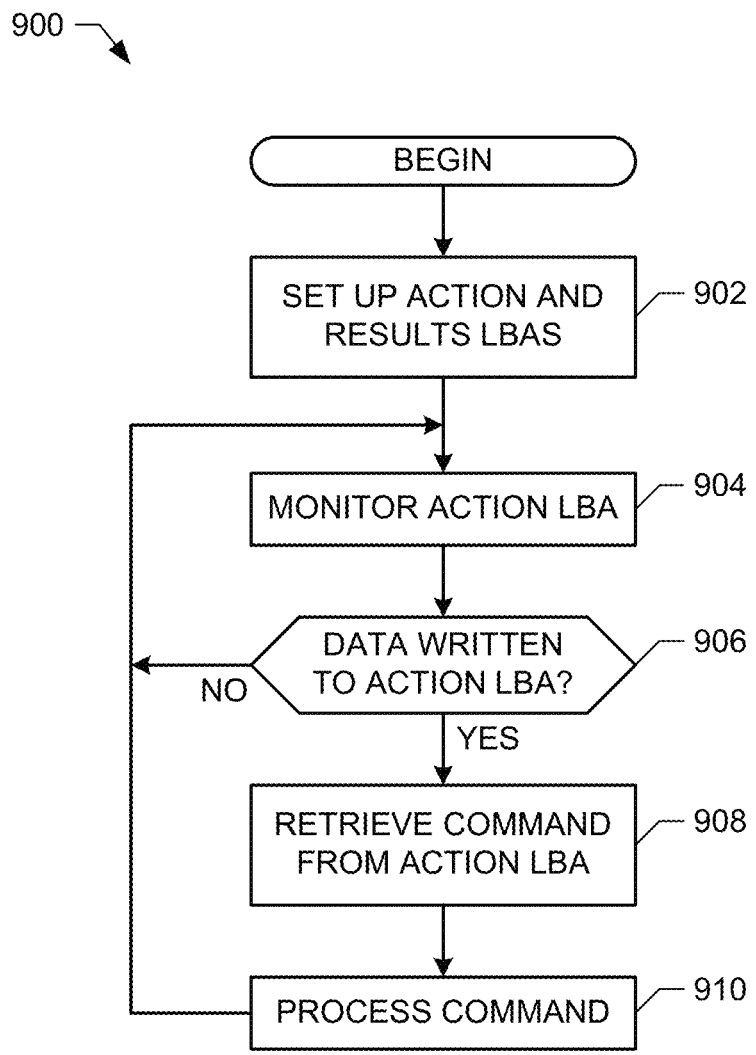
FIG. 9 is a flowchart representative of example machine readable instructions which may be executed to implement the example data storage device of FIGS. 1 and/or 2 to communicate information between the data storage device and an agent using mailboxing.

FIG. 9 is a flowchart representative of example machine readable instructions 900 which may be executed to implement the example data storage devices 102, 202, 504 of FIGS. 1, 2, and/or 5 to communicate information between the data storage device 102, 202 and an agent using mailboxing. The example agent may include a data integrity check application (e.g., the applications 106, 206) or another application operating within an operating system (e.g., the operating systems 104, 204). The example instructions 900 of FIG. 9 will be described with reference to the example agent 502 and the example secure storage system 504 of FIG. 5. In some examples, the instructions 900 of FIG. 9 are implemented using the trusted API 128 and the trusted system firmware 130 operating on the SoC 118 of FIGS. 1 and/or 2.

The example instructions 900 begin by setting up action and results LBAs 506, 508 (block 902). The example instructions may configure the action LBA 506 and the result LBA 508 for communication with an agent 502 that is authorized to communicate with the secure storage device 504. For example, the secure storage device 504 may configure the action LBA 506 and the result LBA 508 to be beyond the upper limit of addresses that an operating system can access. As a result, the example agent 502 is required to use an alternate channel of communication such as a tunnel 510 to communicate information via the action LBA 506 and/or the results LBA 508.

The example secure storage device 504 monitors the action LBA 506 to determine if an action has been written to the action LBA 506 (block 904). For example, the agent 502 may write an action to perform a read, write, or other type of action with the secure storage device 504. The example secure storage device 504 monitors the action LBA 506 by scanning and analyzing incoming commands for specific bit patterns. The example secure storage device 504 determines whether data is written to the action LBA 506 (block 906). If data has been written to the action LBA 506 (block 906), the example secure storage device 504 retrieves the command that was written to the action LBA 506 (block 908). The example data written to the action LBA 506 has a data structure including example fields 710A-710E as described above with reference to FIG. 7. The example secure storage device 504 processes the retrieved command (block 910). After processing the command (block 910), or if data has not been written to the action LBA 506 (block 406), control returns to block 404 to continue monitoring the action LBA 506.

Figure 10:
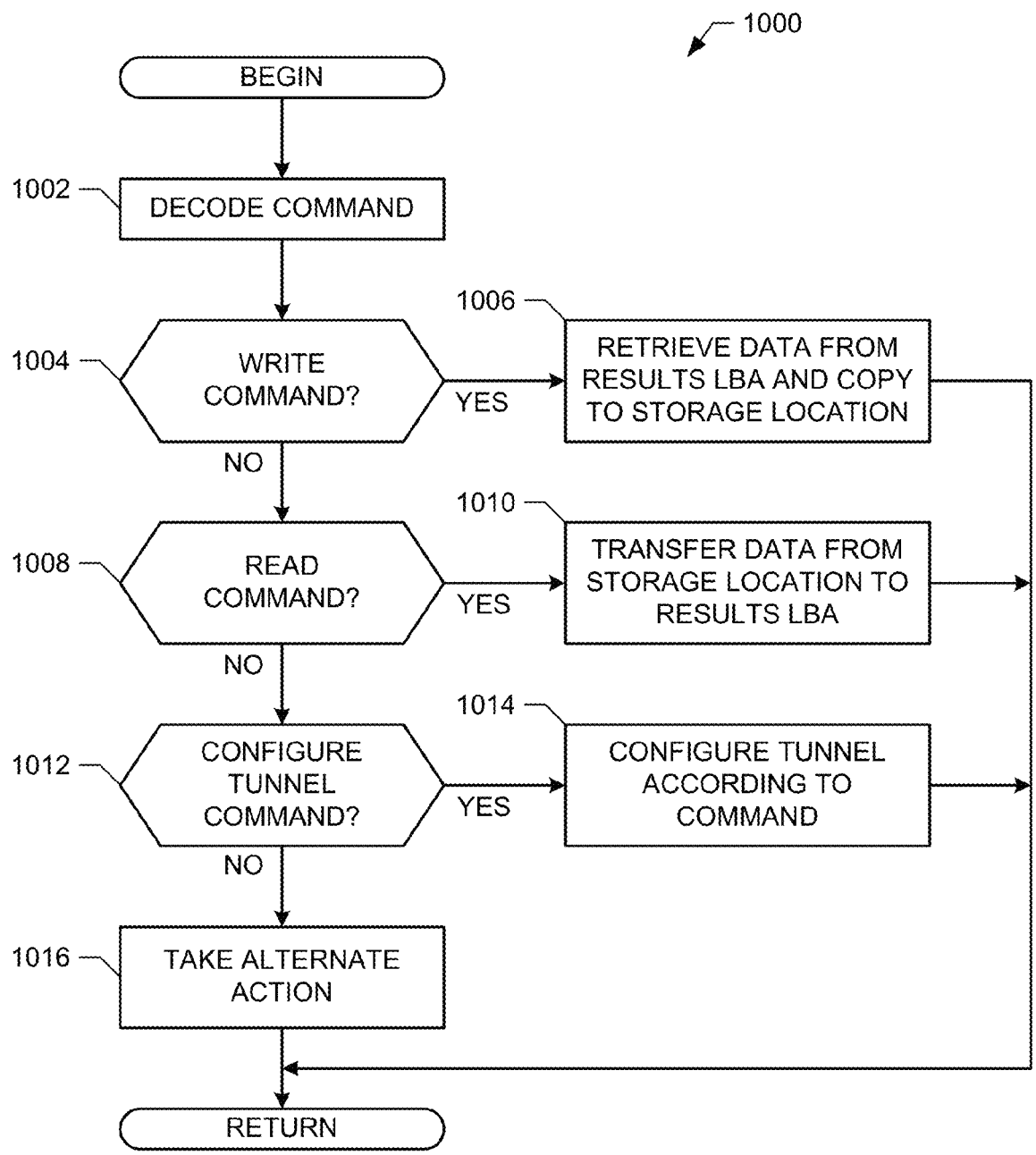
FIG. 10 is a flowchart representative of example machine readable instructions which may be executed to implement the example data storage device of FIGS. 1 and/or 2 to process mailboxing communication commands.

FIG. 10 is a flowchart representative of example machine readable instructions 1000 which may be executed to implement the example data storage device of FIGS. 1 and/or 2 to process mailboxing communication commands. The example agent may include a data integrity check application (e.g., the applications 106, 206) or another application operating within an operating system (e.g., the operating systems 104, 204). The example instructions 1000 of FIG. 10 will be described with reference to the example agent 502 and the example secure storage system 504 of FIG. 5. In some examples, the instructions 1000 of FIG. 10 are implemented using the trusted API 128 and the trusted system firmware 130 operating on the SoC 118 of FIGS. 1 and/or 2.

The example secure storage device 504 decodes the command (block 1002). For example, the secure storage device 504 decodes the command by retrieving the authorization message (e.g., the authorization message 710A of FIG. 7) from the command. The secure storage device 504 may further determine whether the command is authorized by analyzing the authorization message 710A.

If the secure storage device 504 determines the command is a write command (block 1004). The example secure storage device 504 may determine the type of command by reviewing the data in the command code field (e.g., command code field 710C as described with reference to FIG. 7). If the command is a write command (block 1004), the example secure storage device 504 directs the data that is to be written in the results LBA 508 to the storage location indicated in the command (block 1006).

If the command is not a write command (block 1004), the example secure storage device 504 determines if the command is a read command (block 1008). If the command is a read command (block 1008), the example secure storage device 504 redirects the read from the results LBA 508 to a storage location specified in the command (block 1010).

If the command is not a read command (block 1008), the example secure storage device 504 determines if the command is a configure command (block 1012). If the command is a configure command, the example secure storage device 504 configures the tunnel according to the data in the command (block 1014). If the command is not a configure tunnel command (block 1012), the example secure storage device 504 takes an alternative action (block 1016). Example alternative actions could include ignoring the command, storing an error code in the results LBA 508 indicating the command is not understood, and/or any other action.

Figure 11:
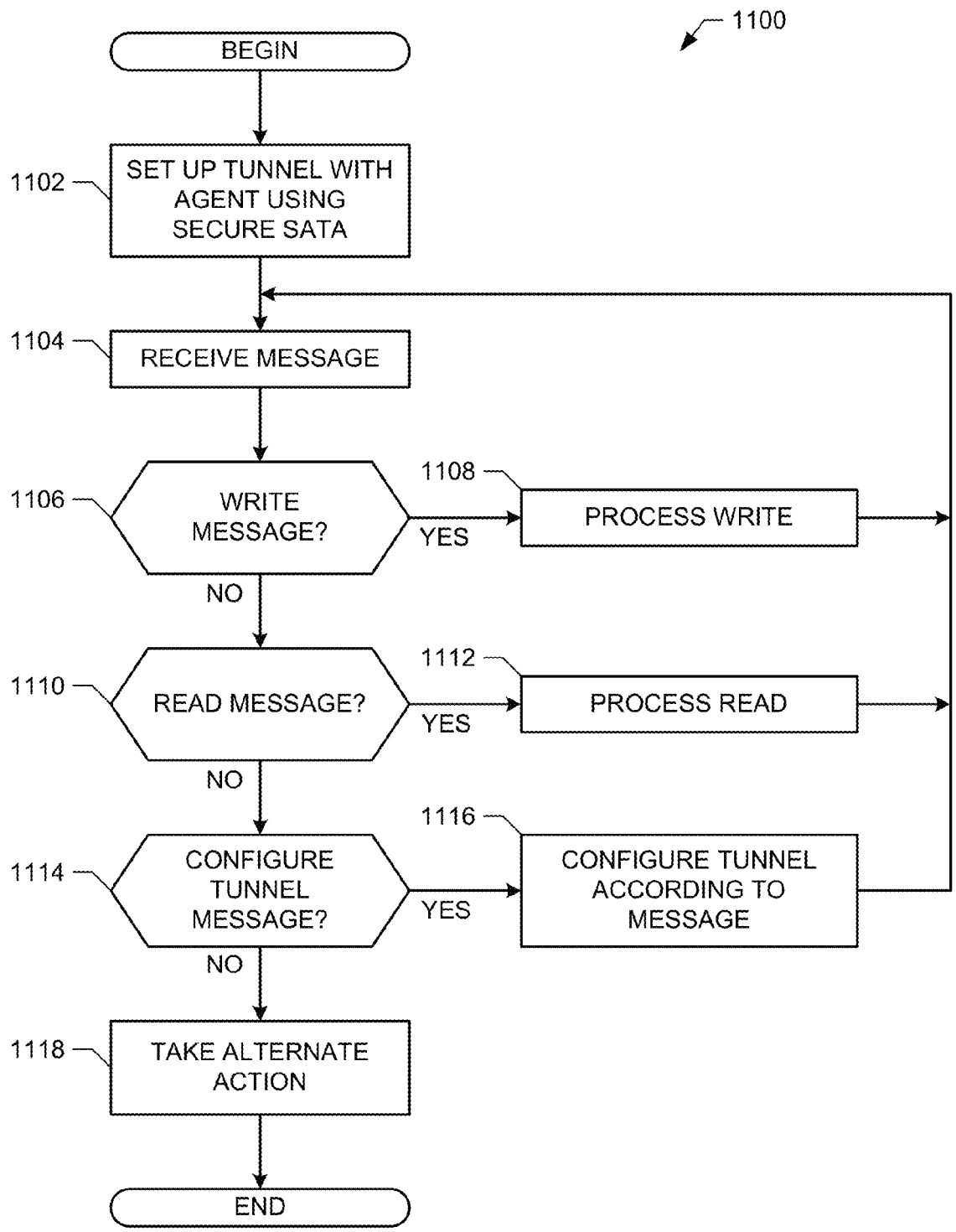
FIG. 11 is a flowchart representative of example machine readable instructions which may be executed to implement the example data storage device of FIGS. 1 and/or 2 to process tunnel messages that are transmitted using secure Serial Advanced Technology Attachment (SATA).

FIG. 11 is a flowchart representative of example machine readable instructions 1100 which may be executed to implement the example data storage devices 102, 202 of FIGS. 1 and/or 2 to process tunnel messages that are transmitted using secure SATA. In contrast to the example instructions 1000 of FIG. 10, the example agent and the example secure storage system may perform the example instructions 1100 to use the trusted send facility of the secure SATA protocol to negotiate a session key between an agent (e.g., the applications 114, 106, 206, the agent 502 of FIGS. 1, 2, and/or 5) and a data storage device (e.g., the data storage devices 102, 202, the secure storage system 504 of FIGS. 1, 2, and/or 5. The example instructions 1100 of FIG. 11 will be described below with reference to the agent 602 and the secure storage device 604 of FIG. 6.

The example secure storage device 604 establishes a tunnel 606 with the example agent 602 (e.g., using the secure SATA trusted send facility) (block 1102). The example agent may negotiate a session key with the secure storage device 604. In some examples, the session key is unique to the agent 602 and the secure storage device 604, such that data can be securely communicated between the agent 602 and the secure storage device 604 using the session key. In some examples, the session key is used to identify the agent 602 to the secure storage device 604 and to encrypt/decrypt the data communicated using the tunnel 606.

The example secure storage device 604 receives a message from the agent 602 (block 1104). The example message includes authentication data that identifies the message as originating from the agent 602 and includes authentication credentials, such as the session key, that can be used to decrypt the data in the message. The example message may include the authentication data such as the negotiated session key and the data that is encrypted using that key. In the example of FIG. 11, receiving the message at block 1104 includes decrypting the data contained in the message so that the secure storage device 604 can process the received message.

The example secure storage device 604 determines if the received message is a write message (block 1106). If the message is a write message (block 1106), the example secure storage device 604 processes the write message (block 1108). For example, the secure storage device 604 may process the write message by determining which data is to be written and where the data is to be written to and writing that data using the location and data to be written from the message. In some examples, the secure storage device 604 returns a message to the agent 602 via the tunnel 606 indicating the results of the write (e.g., success, failure, etc.).

If the received message is not a write message (block 1106) the example secure storage device 604 determines if the received message is a read message (block 1110). If the received message is a read message (block 1110), the example secure storage device 604 processes the read message (block 1112). For example, the secure storage device 604 may retrieve the location of the read and that the amount of data to be read from that location. The example secure storage device 604 also sends a message back to the agent 602 including the data that was read via the tunnel 606.

If the message was not a read message (block 1110), the example secure storage device 604 determines if that received message is a configure tunnel message (block 1114). If the received message is a configure tunnel message (block 1114), the example secure storage device 604 configures the tunnel 606 according to configuration parameters in the message (block 1116). The example secure storage device 604 may send a return message back to the agent 602 via the tunnel 606 indicating the success or failure of the command. If the received message is not a configure tunnel message (block 1114), the example secure storage device 604 takes an alternative action (e.g., drops the received message, sends a message back indicating the received message is not understood, etc.).

While the example instructions 1100 of FIG. 11 use the trusted send facility of secure SATA, other storage protocols that include a trusted send facility may additionally or alternatively be used to set up a tunnel between the agent 602 and the secure storage system 604.

Figure 12:
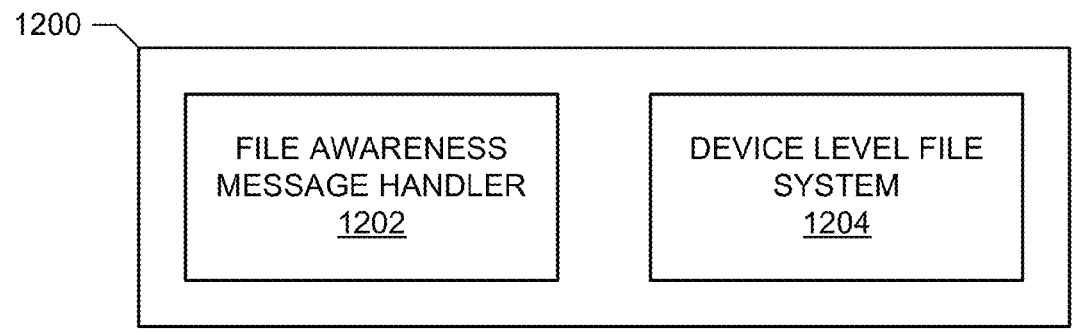
FIG. 12 illustrates a block diagram of a file awareness block to implement the example file awareness block of FIG. 2.

FIG. 12 illustrates a block diagram of example file awareness firmware 1200 to implement the example embedded file awareness firmware 214 of FIG. 2. The example file awareness firmware 1200 includes a file awareness message handler 1202 to handle messages such as the Set_fileupdate, Get_fileupdate, and/or Init_filesystem messages. The example file awareness message handler 1202 parses the messages to, among other things, determine the arguments for use in performing the commands. The example file awareness firmware 1200 further includes a device level file system 1204 for implementing a file system or portions of a file system in the storage device (e.g., the storage device 202 of FIG. 2). The example device level file system 1204 may be used to implement the example device file system 228 of FIG. 2.

Figure 13:
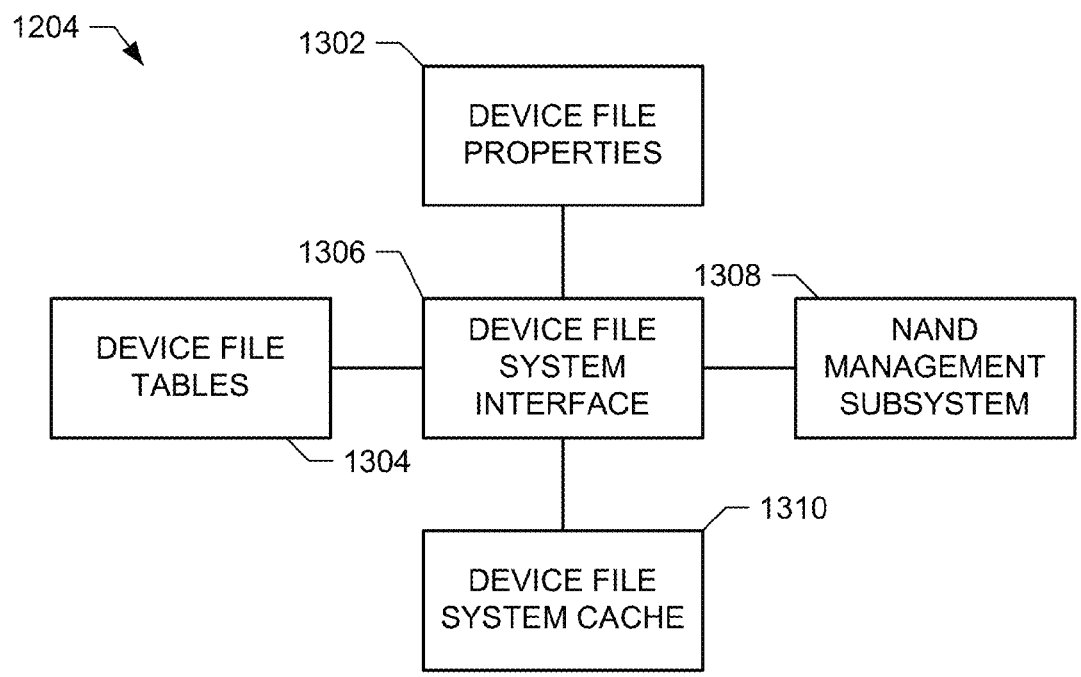
FIG. 13 illustrates a more detailed block diagram of the example device level file system of FIG. 12.

FIG. 13 illustrates a more detailed block diagram of the example device level file system 1204 of FIG. 12. The example device level file system 1204 of FIG. 13 includes device file properties 1302, device file tables 1304, a device file system interface 1306, a memory management subsystem 1308 (e.g., a NAND management subsystem), and a device file system cache 1310.

Figure 14:
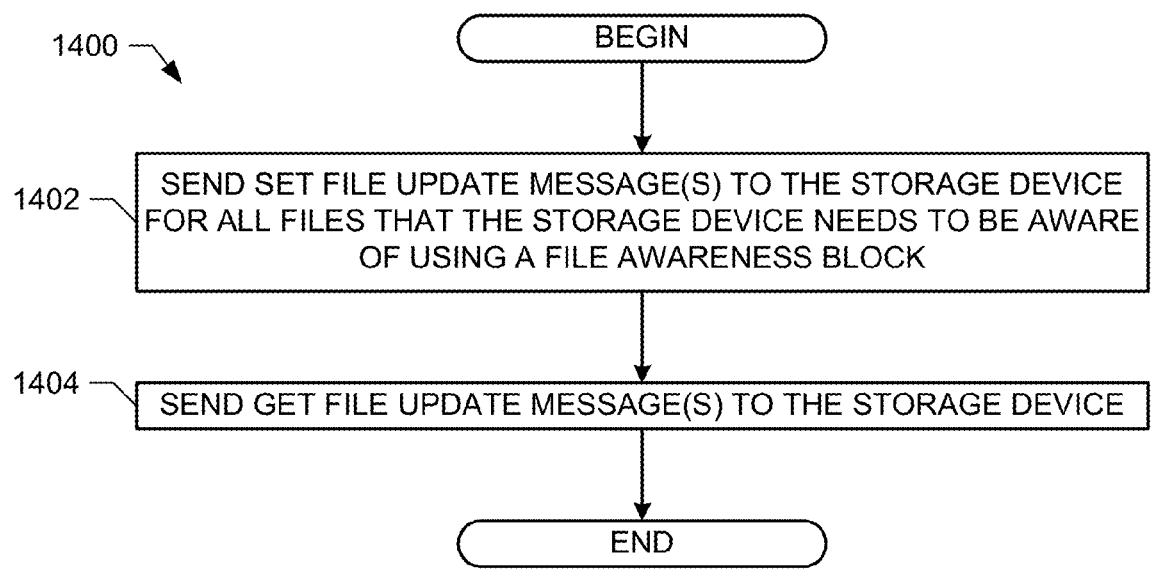
FIG. 14 is a flowchart representative of example machine readable instructions which may be executed to implement the example data storage device of FIG. 2 to perform trusted operations on a system.

FIG. 14 is a flowchart representative of example machine readable instructions which may be executed to implement the example data storage device 202 of FIG. 2 to perform trusted operations on a system. The example instructions 1400 of FIG. 14 may be performed by an agent (e.g., the applications 114, 206 of FIG. 2) in communication with data storage device firmware 208 of FIG. 2.

Host to device communication can be used to accomplish trusted operations in the storage device such as computation of hashes or comparison of hash signatures. The example agent 206 sends one or more set file update messages to the data storage device 202 for files of which the embedded file awareness firmware 214 in the storage device 202 needs to be aware (block 1402). For example, the set file update (UFS1, source1.exe, properties(hrwx,dr), <10, . . . 112>) message causes the "source1.exe" file to be visible to the device file system 228 to be read by the data storage device firmware 208 and specifies that the file is resident at LBA range from 10 to 112. Similarly, a set file update (UFS1, src1hash.out, properties(hrwx,drw), <120, . . . 122>) message causes the "src1hash.out" file to be visible to the device file system 228 to be read by the data storage device firmware 208 and specifies that the file is resident at LBA range from 120 to 122.

The example agent 206 sends one or more get file update messages to the storage device 202 (block 1404). For example, the agent 206 may send get file update (UFS1, src1hash.out) message to make the data associated with the "src1hash.out" file visible to the agent 206. Any updates to this file since the last write to this file by the agent 206 or the host reflect these changes.

Figure 15:
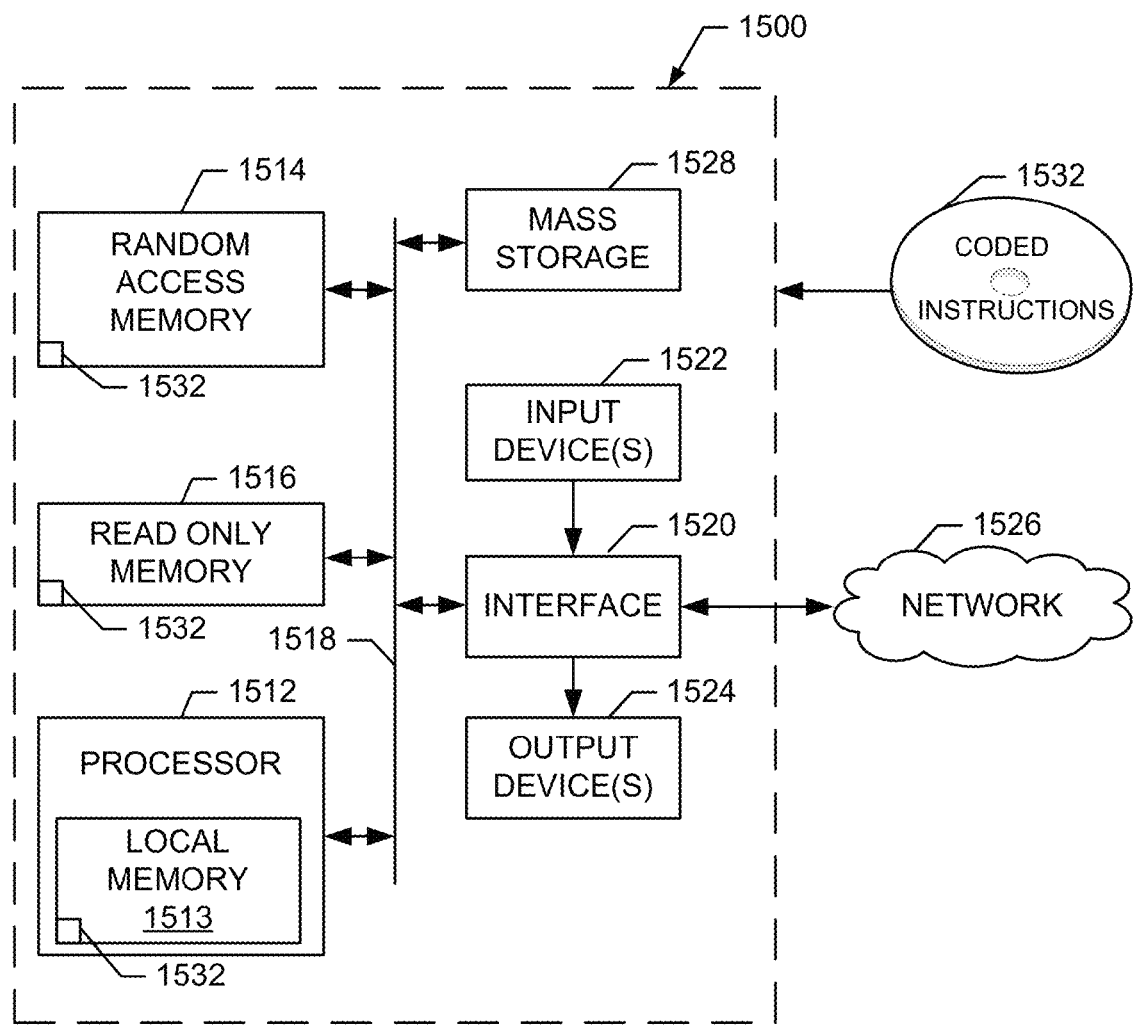
FIG. 15 is a block diagram of an example computer capable of executing the instructions of FIGS. 3, 4, 9-11, and 14 to implement the platforms of FIGS. 1 and/or 2.

FIG. 15 is a block diagram of an example processing platform 1500 capable of executing the instructions of FIGS. 3, 4, 9-11, and 14 to implement the platforms 100, 200 of FIGS. 1 and/or 2. The platform 1500 can be, for example, a server, a personal computer, a mobile phone (e.g., a cell phone), a personal digital assistant (PDA), an Internet appliance, or any other type of computing device for which data integrity checks may be performed.

The platform 1500 of the instant example includes a processor 1512. For example, the processor 1512 can be implemented by one or more microprocessors or controllers from any desired family or manufacturer.

The processor 1512 includes a local memory 1513 (e.g., a cache) and is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The platform 1500 also includes an interface circuit 1520. The interface circuit 1520 may be implemented by any type of interface standard, such as an Ethernet interface, a universal serial bus (USB), and/or a PCI express interface.

One or more input devices 1522 are connected to the interface circuit 1520. The input device(s) 1522 permit a user to enter data and commands into the processor 1512. The input device(s) can be implemented by, for example, a keyboard, a mouse, a touchscreen, a track-pad, a trackball, isopoint and/or a voice recognition system.

One or more output devices 1524 are also connected to the interface circuit 1520. The output devices 1524 can be implemented, for example, by display devices (e.g., a liquid crystal display, a cathode ray tube display (CRT), a printer and/or speakers). The interface circuit 1520, thus, typically includes a graphics driver card.

The interface circuit 1520 also includes a communication device (e.g., communication device 56) such as a modem or network interface card to facilitate exchange of data with external computers via a network 1526 (e.g., an Ethernet connection, a digital subscriber line (DSL), a telephone line, coaxial cable, a cellular telephone system, etc.).

The platform 1500 also includes one or more mass storage devices 1528 for storing software and data. Examples of such mass storage devices 1528 include floppy disk drives, hard drive disks, solid state storage, compact disk drives and digital versatile disk (DVD) drives. The mass storage device 1528 may implement the data storage devices 102, 202.

The coded instructions 1532 of FIGS. 3, 4, 9-11, and 14 may be stored in the mass storage device 1528, in the volatile memory 1514, in the non-volatile memory 1516, and/or on a removable storage medium such as a CD or DVD.

Figure 16:
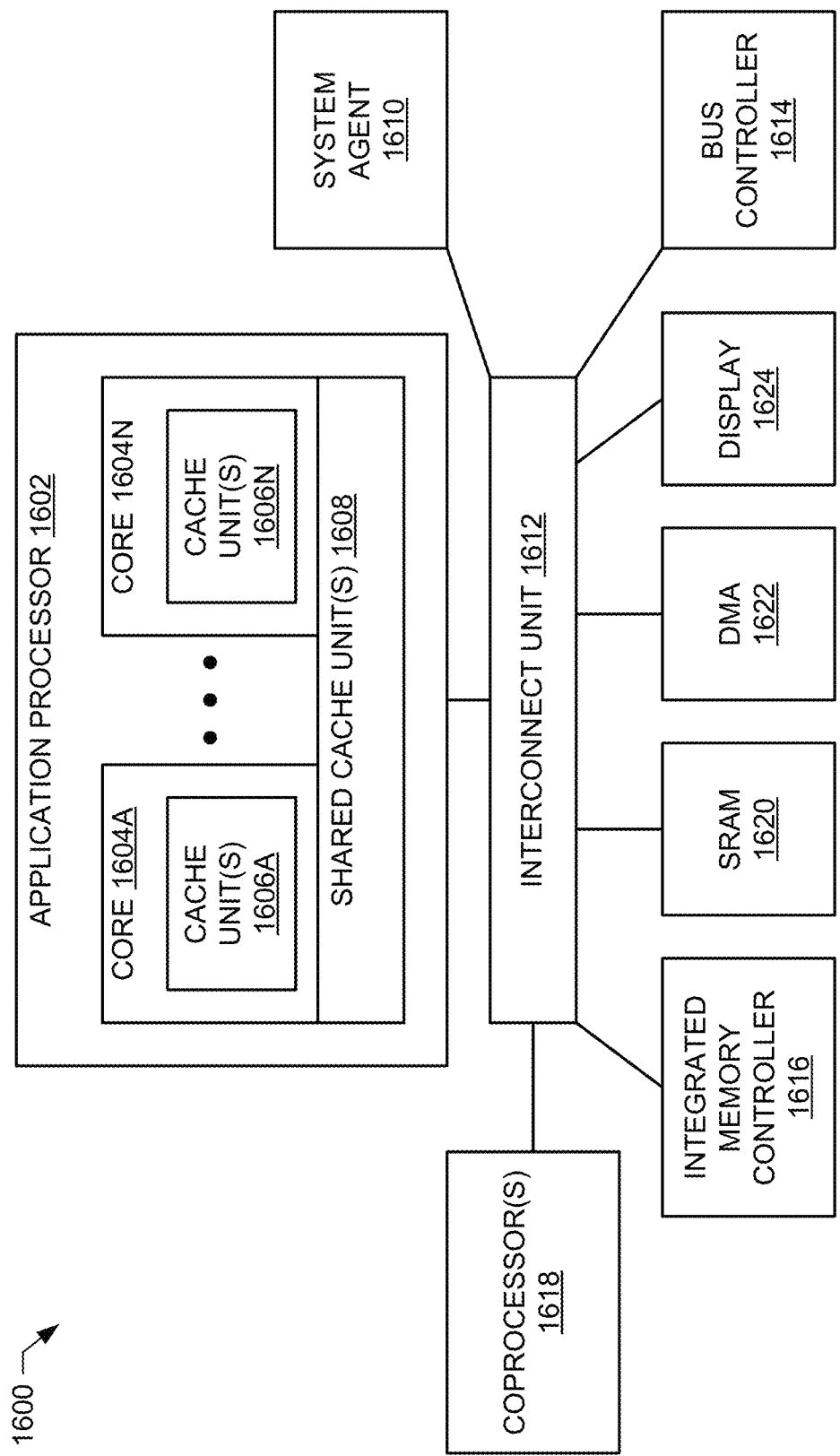
FIG. 16 is a block diagram of an example system-on-a-chip capable of executing the instructions of FIGS. 3, 4, 9-11, and 14 to implement the data storage devices of FIGS. 1 and/or 2.

FIG. 16 is a block diagram of an example system-on-a-chip 1600 capable of executing the instructions of FIGS. 3, 4, 9-11, and 14 to implement the SoC 118 of the data storage devices 102, 202 of FIGS. 1 and/or 2. The example SoC 1600 of FIG. 16 includes an application processor 1602 having core(s) 1604A ... 1604N. The example core(s) 1604A ... 1604N may be general purpose cores (e.g., general purpose in-order cores, general purpose out-of-order cores, a combination of the two) and/or special purpose cores intended primarily for graphics and/or scientific (throughput). Thus, the example application processor 1602 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor 1602 may be implemented on one or more chips. The processor 1602 may be a part of and/or may be implemented on one or more substrates using any of a number of process technologies, such as, for example, BiCMOS, CMOS, or NMOS.

The memory hierarchy includes one or more levels of cache 1606A ... 1606N within the cores 1604A ... 1604N, a set or one or more shared cache units 1608. The set of shared cache units 1608 may include one or more mid-level caches, such as level 2 (L2), level 3 (L3), level 4 (L4), or other levels of cache, a last level cache (LLC), and/or combinations thereof. In some examples, coherency is maintained between one or more shared cache units 1608 and cores 1604A ... 1604N.

In some embodiments, one or more of the cores 1604A ... 1604N are capable of multi-threading. A system agent 1610 includes components to coordinate and operate the cores 1604A ... 1604N. The system agent 1610 may include, for example, a power control unit (PCU) and a display unit. The PCU may be or include logic and components needed for regulating the power state of the cores 1604A ... 1604N. The display unit is for driving one or more externally connected displays.

The cores 1604A ... 1604N may be homogenous or heterogeneous in terms of architecture instruction set; that is, two or more of the cores 1604A ... 1604N may be capable of execution the same instruction set, while others may be capable of executing only a subset of that instruction set or a different instruction set.

An interconnect unit(s) 1612 is coupled to the application processor 1602; the system agent 1610; a bus controller unit 1614; an integrated memory controller unit(s) 1616; coprocessor(s) 1618 which may include integrated graphics logic, an image processor, an audio processor, and a video processor; static random access memory (SRAM) 1620; a direct memory access (DMA) unit 1622; and a display unit 1624 for coupling to one or more external displays. The example coprocessor(s) 1618 include a special-purpose processor, such as, for example, a network or communication processor, compression engine, GPGPU, a high-throughput MIC processor, embedded processor, or the like.

An example method disclosed above includes establishing a secure tunnel between a storage device and an agent, transferring first data from the storage device to the agent via the secure tunnel, the secure tunnel to prevent software executing in an operating system from modifying the data, and identifying a data modification by comparing the first data to second data. In some examples, the first data comprises a hash of trusted data. In some such examples, the method further includes transferring third data from the storage device to the agent via the secure tunnel, the third data comprising a hash of untrusted data. Some such example methods further include generating the third data at the agent and transferring the third data from the agent to the storage device via the secure tunnel.

Some example methods further include transferring third data from the storage device to the agent via the secure tunnel, the third data comprising untrusted data. Some examples include identifying a presence of a software application on a platform based on the comparison.

Another example method disclosed above includes establishing a secure tunnel between a storage device and an agent, providing a command from the agent to the storage device, accessing first data at the storage device in response to the command, and identifying a modification to data stored on the storage device by comparing the first data to second data using the storage device. In some examples, comparing the first data to the second data comprises using at least one of a processor or a system-on-a-chip in the storage device. In some examples, the command comprises at least one of a file system identification, a file name identification, a command to generate a hash of a file stored on the storage device, or a command to compare a first hash value to a second hash value.

Some example methods further include applying a rule to the comparison at the storage device to determine whether the comparison is representative of malware. Some examples include transferring a result of the comparison from the storage device to the agent via the secure tunnel.

An example system disclosed above includes a storage device comprising a secure storage area and a processor, and an agent. The agent is to establish a secure tunnel to the storage device, obtain a requested filefirst data via the secure tunnel, the secure tunnel to prevent software executing in an operating system from modifying the data prior to the agent obtaining the first data, and identify a data modification by compare the requested filefirst data to second data. In some examples, the first data comprises a hash of trusted data stored in the storage device. In some example systems, the storage device is to provide third data to the agent via the secure tunnel, the third data comprising a hash of untrusted data. In some such examples, the agent is to generate the third data and provide the third data to the storage device via the secure tunnel.

In some examples, the storage device is to store the trusted data in the secure storage area. In some examples, the agent is to access a trusted application programming interface exposed by the storage device to establish the secure tunnel. In some example systems, the agent is to obtain the second data from the storage device. In some examples, the agent comprises a file integrity checker to apply a rule to the comparison to determine whether the comparison is representative of malware.

Another example system disclosed above includes a storage device and an agent. The storage device comprises a secure storage area and a processor. The agent is to establish a secure tunnel to the storage device and send a command to the storage device via the secure tunnel, where the processor is to identify a modification to data stored on the storage device by comparing first data stored in the secure storage area to second data in response to the command. In some examples, wherein the first data comprises a hash of trusted datastored in the secure storage area.

In some example systems, the second data comprises a hash of untrusted data. In some examples, the processor is to compare a difference between the first data and the second data to a malware definition to determine whether malware is present on the system. In some examples, the processor is to provide a difference between the first data and the second data to the agent, the agent to generate a report based on the difference.

Example tangible computer readable media are disclosed, comprising computer readable instructions which, when executed, cause a processor to establish a secure tunnel between a storage device and an agent, transfer first data from the storage device to the agent via the secure tunnel, the secure tunnel to prevent software executing in an operating system from modifying the data, and identify a data modification by comparing the first data to second data. In some examples, the instructions further cause the processor to apply a rule to the data modification to detect malware. In some examples, identifying the data modification comprises identifying a modification to untrusted data stored on the storage device.

Example tangible computer readable media are disclosed, comprising computer readable instructions which, when executed, cause a processor to establish a secure tunnel between a storage device and an agent, provide a command from the agent to the storage device, access first data at the storage device in response to the command, and identify a modification to data stored on the storage device by comparing the first data to second data using the storage device. In some examples, the agent executes on a host platform of the storage device or on a platform remote to the host platform. In some examples, establishing the secure tunnel comprises exposing an application programming interface and receiving a request to the application programming interface from the agent, the call comprising a trusted signature.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
   establishing a secure tunnel between a storage device and an agent;
   obtaining first data from the storage device at the agent via the secure tunnel, the secure tunnel preventing software executing in an operating system from modifying the first data; and
   identifying, at the agent, a data modification by comparing the first data to second data, the first data including trusted data and the second data including untrusted data, or, the first data including a hash of the trusted data and the second data including a hash of the untrusted data.

2. A method as defined in claim 1, further including obtaining the second data from the storage device at the agent via the secure tunnel, the second data including the hash of the untrusted data.

3. A method as defined in claim 2, further including generating the second data at the agent and transferring the second data from the agent to the storage device via the secure tunnel, the transferring of the second data from the agent to the storage device via the secure tunnel occurring before the obtaining of the second data from the storage device to the agent via the secure tunnel.

4. A method as defined in claim 1, further including transferring the second data from the storage device to the agent via the secure tunnel, the second data including the untrusted data.

5. A method as defined in claim 1, further including identifying a presence of a software application on a platform based on the comparison.

6. A system, comprising:
   a storage device including a secure storage area and a processor; and
   an agent to:
      establish a secure tunnel to the storage device;
      obtain first data via the secure tunnel, the secure tunnel to prevent software executing in an operating system from modifying the first data prior to the agent obtaining the first data; and
      identify a data modification by comparing the first data to second data, the first data including trusted data and the second data including untrusted data, or, the first data including a hash of the trusted data and the second data including a hash of the untrusted data.

7. A system as defined in claim 6, wherein the storage device is to provide the second data to the agent via the secure tunnel, the second data including the hash of the untrusted data.

8. A system as defined in claim 7, wherein the agent is to generate the second data and provide the second data to the storage device via the secure tunnel, the storage device to provide the second data to the agent via the secure tunnel after the agent provides the second data to the storage device via the secure tunnel.

9. A system as defined in claim 6, wherein the storage device is to store the trusted data in the secure storage area.

10. A system as defined in claim 6, wherein the agent is to access a trusted application programming interface exposed by the storage device to establish the secure tunnel.

11. A system as defined in claim 6, wherein the agent is to obtain the second data from the storage device.

12. A system as defined in claim 6, wherein the agent includes a file integrity checker to apply a rule to the comparison to determine whether the comparison is representative of malware.

13. A tangible computer readable storage medium comprising computer readable instructions which, when executed, cause a processor to at least:
- establish a secure tunnel between a storage device and an agent;
- access first data from the storage device at the agent via the secure tunnel while the secure tunnel prevents software executing in an operating system from modifying the first data; and
- identify a data modification by comparing the first data to second data, the first data including trusted data and the second data including untrusted data, or, the first data including a hash of the trusted data and the second data including a hash of the untrusted data.

14. A storage medium as defined in claim 13, wherein the instructions further cause the processor to apply a rule to the data modification to detect malware.

15. A storage medium as defined in claim 13, wherein identifying the data modification includes identifying a modification to untrusted data stored on the storage device.

* * * * *